United States Patent [19]

Hirai et al.

[11] Patent Number: 5,922,640
[45] Date of Patent: Jul. 13, 1999

[54] ADSORBENT FOR CARBON MONOXIDE

[75] Inventors: Hidefumi Hirai, Chofu; Nobutoshi Ootsuka, Hasuda; Kenji Sakai, Tokyo; Toshiyuki Shimazawa, Kashiwa, all of Japan

[73] Assignee: Mitsubishi Gas Chemical Company, Inc., Tokyo, Japan

[21] Appl. No.: 08/807,369

[22] Filed: Feb. 27, 1997

[30] Foreign Application Priority Data

| Feb. 29, 1996 | [JP] | Japan | 8-067397 |
| Feb. 29, 1996 | [JP] | Japan | 8-067400 |
| Feb. 29, 1996 | [JP] | Japan | 8-067407 |
| Feb. 29, 1996 | [JP] | Japan | 8-067486 |

[51] Int. Cl.$^6$ .......................... B01J 20/10; B01J 20/20; B01J 20/22
[52] U.S. Cl. .......................... 502/401; 502/407; 502/414; 502/417
[58] Field of Search .......................... 252/189, 190; 502/401, 417, 407, 414

[56] References Cited

U.S. PATENT DOCUMENTS

| 3,658,463 | 4/1972 | Billings | 423/246 |
| 3,855,327 | 12/1974 | Billings | 585/357 |
| 4,587,114 | 5/1986 | Hirai | 502/418 |
| 4,818,255 | 4/1989 | Matsuura | 423/247 |
| 4,917,711 | 4/1990 | Xia et al. | 55/68 |
| 5,126,469 | 6/1992 | Bank | 556/415 |

FOREIGN PATENT DOCUMENTS

| 0 472 180 A2 | 2/1992 | European Pat. Off. . |
| 0 679 435 A1 | 11/1995 | European Pat. Off. . |
| 54-071789 | 6/1979 | Japan . |
| 58-124516 | 7/1983 | Japan . |
| 58-156517 | 9/1983 | Japan . |
| 59-69414 | 4/1984 | Japan . |
| 59-105841 | 6/1984 | Japan . |
| 59-136134 | 8/1984 | Japan . |
| 61-263635 | 11/1986 | Japan . |
| 62-113710 | 5/1987 | Japan . |
| 63-4845 | 1/1988 | Japan . |
| 6-9651 | 2/1994 | Japan . |

*Primary Examiner*—Michael Lewis
*Assistant Examiner*—Peter DiMauro
*Attorney, Agent, or Firm*—Armstrong, Westerman, Hattori, McLeland & Naughton

[57] ABSTRACT

Disclosed are an adsorbent for CO, comprising a composite comprised of a porous inorganic carrier and, carried thereon, a binary complex of a nitrogen-containing compound and a copper(I) halide, the nitrogen-containing compound being at least one member selected from at least one pyridine compound and a diamine represented by $R^1R^2N(CH_2)_n$—$NR^3R^4$, wherein n is 2 or 3 and each of $R^1$, $R^2$, $R^3$ and $R^4$ independently represents a hydrogen atom or a $C_1$–$C_4$ alkyl group, with the proviso that when n is 2, each of at least two of $R^1$, $R^2$, $R^3$ and $R^4$ represents a $C_1$–$C_4$ alkyl group atoms and that when n is 3, at least one of $R^1$, $R^2$, $R^3$ and $R^4$ represents a $C_1$–$C_4$ alkyl group, and a method for separating carbon monoxide by adsorption using the adsorbent. The adsorbent is advantageous in that the adsorbent can adsorb CO with high selectivity and has high adsorptive and desorptive ability for CO, that the adsorbent can be produced using a conventional carrier and without using hydrochloric acid, with economical advantages, and that since the adsorbent is a solid, it can be handled with ease.

4 Claims, No Drawings

ADSORBENT FOR CARBON MONOXIDE

BACKGROUND OF THE INVENTION

1. Field of the Invention

The present invention relates to a novel adsorbent for carbon monoxide. More particularly, the present invention is concerned with an adsorbent for carbon monoxide, comprising a composite comprised of a porous inorganic carrier and, carried thereon, a binary complex of a copper(I) halide and a nitrogen-containing compound selected from the group consisting of (a) at least one pyridine compound selected from pyridine and a derivative thereof and (b) a specific diamine. The adsorbent of the present invention can be produced by a method comprising contacting the porous inorganic carrier with a solution of the above-mentioned binary complex of the nitrogen-containing compound and the copper(I) halide in an organic solvent for the binary complex. The adsorbent of the present invention is advantageous not only in that by contacting a gaseous mixture containing carbon monoxide with the adsorbent, the carbon monoxide can be separated from the gaseous mixture, but also in that by desorbing and releasing carbon monoxide from the adsorbent having adsorbed thereon carbon monoxide into a carbon monoxide-depleted gas, a gaseous mixture having an increased concentration of carbon monoxide can be obtained. Further, even when the adsorbent of the present invention is unintendedly caused to contact an oxygen-containing gas, such as the air, by an operational error or the like, so that the adsorbent is deteriorated to have a poor adsorptive and desorptive ability for carbon monoxide, the adsorptive ability and desorptive ability of the deteriorated adsorbent can be recovered by treating the deteriorated adsorbent with a reducing agent.

2. Prior Art

Carbon monoxide has a wide variety of uses, for example, as a fuel, as a material for the synthesis of organic compounds, as a reducing agent for the reduction of minerals, and the like. Carbon monoxide is also used as one of the main materials in a field which is generally called "$C_1$ chemistry".

Carbon monoxide is produced in the form of the so-called synthetic gas which is produced from coal, petroleum, natural gas or the like by a partial oxidation method, a steam-reforming method or the like. Carbon monoxide is also contained in a by-product gas and an off-gas, which are generated in ironworks and a petroleum refinery, respectively. In the above-mentioned cases, carbon monoxide is obtained in the form of a gaseous mixture thereof with hydrogen, nitrogen, carbon dioxide, methane, oxygen and the like. In many cases, such a gaseous mixture is saturated with water. Therefore, for obtaining carbon monoxide usable as a material in the chemical industry, it is necessary to separate carbon monoxide from the above-mentioned gaseous mixture.

The separation of carbon monoxide from the gaseous mixture can be conducted by an adsorptive separation method, such as a pressure-swing method or a temperature-swing method. The pressure-swing method is a method in which a gaseous mixture containing carbon monoxide is contacted with an adsorbent for carbon monoxide to adsorb the carbon monoxide thereon, and the resultant adsorbent having adsorbed thereon carbon monoxide is exposed to a reduced pressure atmosphere so as to cause the carbon monoxide to be desorbed and separated from the adsorbent. The temperature-swing method is a method in which a gaseous mixture containing carbon monoxide is contacted with a adsorbent for carbon monoxide to adsorb the carbon monoxide thereon, and the resultant adsorbent having adsorbed thereon carbon monoxide is subjected to heat treatment so as to cause the carbon monoxide to be desorbed and separated from the adsorbent.

Heretofore, various types of adsorbents have been proposed in connection with the separation of carbon monoxide from a gaseous mixture containing carbon monoxide by the pressure-swing method or the temperature-swing method.

For example, a solid adsorbent has been proposed which is obtained by a method comprising adding a copper(I) halide or copper(I) oxide to a solvent followed by stirring to obtain a solution or a suspension, adding activated carbon to the solution or the suspension to obtain a mixture, and removing the solvent from the obtained mixture by evacuation, distillation or the like. (see, for example, Unexamined Japanese Patent Application Laid-Open Specification Nos. 58-156517 and 59-105841).

Another solid adsorbent has been proposed which is obtained by a method comprising adding a copper(II) halide or a copper(II) oxide to a solvent followed by stirring to obtain a solution or a suspension, adding activated carbon to the solution or the suspension to obtain a mixture, removing the solvent from the obtained mixture by evacuation, distillation or the like to thereby obtain a solid, and optionally, treating the obtained solid with a reducing gas (see, for example, Unexamined Japanese Patent Application Laid-Open Specification Nos. 59-69414 and 59-136134).

Still solid adsorbent has been proposed which is obtained by a method comprising contacting a carrier selected from silica, alumina or silica-alumina with a solution of copper(I) chloride in a solvent therefor, and removing the solvent from the resultant mixture, or obtained by a method comprising heating the above-mentioned carrier, and contacting the heated carrier with a solution of copper(I) chloride in a relatively small amount of the solvent (see, for example, Unexamined Japanese Patent Application Laid-Open Specification Nos. 61-263635 and 62-113710).

A further solid adsorbent has been proposed which is obtained by a method comprising adding copper(I) chloride and aluminum(III) halide to a solvent followed by stirring to obtain a solution, adding activated carbon to the obtained solution to obtain a mixture, and removing the solvent from the obtained mixture by evacuation, distillation or the like (see, for example, Unexamined Japanese Patent Application Laid-Open Specification No. 58-124516).

Still a further solid adsorbent has been proposed which is obtained by a method comprising adding a resin having pyridyl groups and a copper(I) halide and/or copper(I) thiocyanate to a solvent followed by stirring to obtain a solution, and removing the solvent from the obtained solution by distillation under reduced pressure (see, for example, Unexamined Japanese Patent Application Laid-Open Specification No. 63-4845).

Still a further solid adsorbent which is obtained by a method comprising contacting a macroreticular type polystyrene having at least one amino group selected from a primary amino group, a secondary amino group and a tertiary amino group with a solution of a copper(I) halide in a solvent, and removing the solvent from the resultant mixture (see, for example, Examined Japanese Patent Application Publication No. 6-9651).

However, when the above-mentioned conventional solid adsorbent are used for separation of carbon monoxide, various problems inevitably arise, as described below.

The method in which use is made of an adsorbent comprising activated carbon and, carried thereon, a copper(I)

halide, copper(I) oxide, a copper(II) salt or copper(II) oxide, has disadvantages in that the carbon monoxide adsorptive ability of the adsorbent is low, and that, when this method is used for separating carbon monoxide by adsorption from a gaseous mixture of carbon monoxide and carbon dioxide, the adsorbent used in this prior art is likely to adsorb carbon dioxide together with carbon monoxide, so that the adsorptive separation of carbon monoxide cannot be performed with high selectivity. In addition, in this method, when a copper(I) halide is contained in the adsorbent, hydrochloric acid is necessarily used as a solvent in the production of the adsorbent, so that the production equipment suffers vigorous corrosion.

The method in which use is made of an adsorbent comprising silica, alumina or silica-alumina and, carried thereon, copper(I) chloride, has disadvantages in that the adsorptive ability of the adsorbent is low, and that hydrochloric acid is necessarily used as a solvent in the production of the adsorbent, so that the production equipment suffers vigorous corrosion. When the adsorbent used in this method is produced by a method in which a relatively small amount of the solvent is used, and a copper(I) chloride solution is contacted with a carrier which has been preliminarily heated, the adsorbent has an improved adsorptive ability for carbon monoxide; however, the adsorbent has a disadvantage in that it becomes difficult to desorb carbon monoxide from the adsorbent by vacuum treatment.

The method in which use is made of an adsorbent comprising activated carbon and, carried thereon, a binary complex of copper(I) chloride and aluminum(III) chloride, has disadvantages in that the binary complex of copper(I) chloride and aluminum(III) chloride reacts, although slowly, with water contained in a gaseous mixture treated by the adsorbent, so that the binary complex is likely to be deactivated to lose the adsorptive activity and generates hydrogen chloride. For suppressing the deactivation of the binary complex and removing the generated hydrogen chloride, it is necessary to place a dehumidifying agent bed and a hydrogen chloride removal tower, respectively, on the upstream and downstream sides of the adsorbent bed, relative to the flow direction of the gaseous mixture.

The method in which use is made of an adsorbent comprising a pyridyl group-containing resin and copper(I) halide and/or copper(I) thiocyanate, has disadvantages in that the production of the pyridyl group-containing resin needs high cost and, hence, the adsorbent produced using the pyridyl group-containing resin inevitably becomes expensive, and that the pyridyl group is chemically bonded to the polymer, so that the pyridyl group cannot easily coordinate to the copper(I) ion, leading to a lowering in the carbon monoxide adsorptive ability of the absorbent.

The method in which use is made of an adsorbent comprising a macroreticular polystyrene resin having at least one amino group selected from the group consisting of a primary amino group, a secondary amino group and a tertiary amino group, and a copper(I) halide coordinated to the polystyrene resin, has disadvantages in that the production of the amino group-containing resin needs high cost and, hence, the adsorbent produced using the amino group-containing resin inevitably becomes expensive, and that the amino group is chemically bonded to the polymer, so that the amino group cannot easily coordinate to the copper(I) ion, leading to a lowering in the carbon monoxide adsorptive ability of the adsorbent.

SUMMARY OF THE INVENTION

In these situations, the present inventors have made extensive and intensive studies with a view toward developing an adsorbent for carbon monoxide, which has not only high selectivity for carbon monoxide but also high adsorptive ability for carbon monoxide. As a result, it has unexpectedly been found that a composite, which comprises a porous inorganic carrier and, carried thereon, a binary complex of a nitrogen-containing compound and a copper(I) halide, wherein the nitrogen-containing compound is at least one member selected from the group consisting of pyridine and a derivative thereof (hereinafter, pyridine and a derivative thereof are frequently, collectively referred to as "pyridine compound") and a specific diamine, is not only advantageous in that the adsorbent can efficiently adsorb carbon monoxide with both high selectivity and high adsorptive ability per mole of the copper(I) halide, as compared to the conventional adsorbents, but also in that the carbon monoxide adsorbed on the adsorbent can be easily desorbed and released under moderate conditions. Further, it has also been found that, even when the above-mentioned adsorbent is unintentionally caused to contact an oxygen-containing gas, such as the air, by an operational error or the like, thereby deteriorating the adsorbent to have a poor adsorptive and desorptive ability for carbon monoxide, the adsorptive and desorptive ability of the deteriorated adsorbent can be recovered by treating the deteriorated adsorbent with a reducing agent, such as a reducing gas. The present invention has been completed, based on these novel findings.

Accordingly, it is a primary object of the present invention to provide an adsorbent for carbon monoxide, which is advantageous not only in that the adsorbent can efficiently adsorb carbon monoxide with high selectivity and high adsorptive ability, but also in that the carbon monoxide adsorbed on the adsorbent can be easily desorbed and released under moderate conditions, and, even when the adsorbent is deteriorated by unintentional contact with an oxygen-containing gas, the deteriorated adsorbent can be easily regenerated using a reducing agent.

It is another object of the present invention to provide an advantageous method for producing the above-mentioned adsorbent for carbon monoxide.

It is a further object of the present invention to provide a method for separating carbon monoxide from a gaseous mixture containing carbon monoxide by using the above-mentioned adsorbent.

It is still a further object of the present invention to provide a method for increasing the concentration of carbon monoxide in an atmosphere by using the above-mentioned adsorbent.

It is still a further object of the present invention to provide a method for regenerating a deteriorated adsorbent which is produced by the contact of the above-mentioned adsorbent with an oxygen-containing gas by an operational error or the like, and which is deteriorated with respect to the adsorptive and desorptive ability for carbon monoxide.

The foregoing and other objects, features and advantages of the present invention will be apparent from the following detailed description and appended claims.

DETAILED DESCRIPTION OF THE INVENTION

In an essential aspect of the present invention, there is provided an adsorbent for carbon monoxide, comprising a composite comprised of a porous inorganic carrier and, carried thereon, a binary complex of a nitrogen-containing compound and a copper(I) halide, the nitrogen-containing compound being at least one member selected from the group consisting of (a) at least one pyridine compound selected from pyridine and a derivative thereof and (b) a diamine represented by the following formula (1):

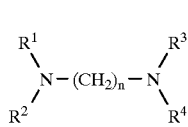
(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, R3 and R represents an alkyl group having 1 to 4 carbon atoms.

For easy understanding of the present invention, the essential features and various preferred embodiments of the present invention are enumerated below.

1. An adsorbent for carbon monoxide, comprising a composite comprised of a porous inorganic carrier and, carried thereon, a binary complex of a nitrogen-containing compound and a copper(I) halide,
   the nitrogen-containing compound being at least one member selected from the group consisting of (a) at least one pyridine compound selected from pyridine and a derivative thereof and (b) a diamine represented by the following formula (1):

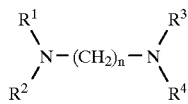
(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, $R^3$ and $R^4$ represents an alkyl group having 1 to 4 carbon atoms.

2. The adsorbent according to item 1 above, wherein the binary complex contains the nitrogen-containing compound in a molar ratio of from 0.2 to 5.0 relative to the copper(I) halide in the binary complex.

3. The adsorbent according to item 1 or 2 above, wherein the binary complex is carried on the porous inorganic carrier in an amount of from 0.2 to 10 mmol in terms of the molar amount of copper(I) in the binary complex per gram of the porous inorganic carrier.

4. The adsorbent according to any one of items 1 to 3 above, wherein the porous inorganic carrier is selected from the group consisting of silica gel, activated carbon, alumina, magnesia, titania, zirconia, silica-magnesia, zeolite and silica-alumina.

5. The adsorbent according to item 4 above, wherein the porous inorganic carrier is selected from the group consisting of silica gel and activated carbon.

6. A method for producing an adsorbent for carbon monoxide, which comprises contacting a porous inorganic carrier with a solution of a binary complex of a nitrogen-containing compound and a copper(I) halide in an organic solvent for the binary complex,
   the nitrogen-containing compound being at least one member selected from the group consisting of (a) at least one pyridine compound selected from pyridine and a derivative thereof and (b) a diamine represented by the following formula (1):

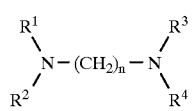
(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, $R^3$ and $R^4$ represents an alkyl group having 1 to 4 carbon atoms, thus providing an adsorbent comprising a composite comprised of the porous inorganic carrier and, carried thereon, the binary complex.

7. The method according to item 6 above, wherein the solution of the binary complex is prepared by contacting the nitrogen-containing compound with the copper(I) halide in the organic solvent.

8. The method according to item 6 or 7 above, wherein the organic solvent is selected from the group consisting of a hydroxyl group-containing compound, a cyano group-containing compound, a carbonyl group-containing compound and a halogenated hydrocarbon.

9. A method for separating carbon monoxide from a gaseous mixture containing carbon monoxide, which comprises contacting a gaseous mixture containing carbon monoxide with the adsorbent of any one of items 1 to 5 above to adsorb the carbon monoxide on the adsorbent.

10. A method for increasing the concentration of carbon monoxide in an atmosphere, which comprises contacting a gaseous mixture containing carbon monoxide with the adsorbent of any one of items 1 to 5 above to cause the carbon monoxide to be adsorbed on the adsorbent, and subjecting the resultant adsorbent having adsorbed thereon the carbon monoxide to at least one treatment in an atmosphere, wherein the treatment is selected from the group consisting of heat treatment in a preselected atmosphere, exposure to a reduced pressure atmosphere and exposure to a carbon monoxide-depleted atmosphere, to thereby desorb and release the carbon monoxide from the adsorbent having adsorbed thereon the carbon monoxide into the atmosphere,
thus increasing the concentration of carbon monoxide in the atmosphere.

11. A method for regenerating an adsorbent for carbon monoxide, which comprises:
    providing a deteriorated adsorbent which is produced by the contact of the adsorbent of any one of items 1 to 5 above with an oxygen-containing gas and which is deteriorated with respect to the adsorptive and desorptive ability for carbon monoxide; and
    treating the deteriorated adsorbent with a reducing agent.

12. A composite comprising activated carbon and, carried thereon, a binary complex of a nitrogen-containing compound and a copper(I) halide,
    the nitrogen-containing compound being selected from the group consisting of (a) at least one pyridine compound selected from pyridine and a derivative thereof and (b) a diamine represented by the following formula (1):

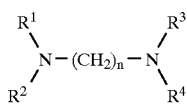

(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, $R^3$ and $R^4$ represents an alkyl group having 1 to 4 carbon atoms.

13. The composite according to item 12 above, wherein the binary complex contains the nitrogen-containing compound in a molar ratio of from 0.2 to 5.0 relative to the copper(I) halide in the binary complex.

14. The composite according to item 12 or 13 above, wherein the binary complex is carried on the activated carbon in an amount of from 0.2 to 10 mmol in terms of the molar amount of copper(I) in the binary complex per gram of the activated carbon.

The composite adsorbent of the present invention for carbon monoxide can be produced by a method comprising contacting a porous inorganic carrier with a solution of a binary complex of a nitrogen-containing compound and a copper(I) halide in an organic solvent for the binary complex, wherein the nitrogen-containing compound is at least one member selected from the group consisting of at least one pyridine compound (selected from pyridine and a derivative thereof) and a diamine represented by formula (1) above.

In a preferred embodiment of the present invention, the above-mentioned solution of the binary complex in an organic solvent is prepared by adding the nitrogen-containing compound and the copper(I) halide to the organic solvent and contacting them with each other in the solvent by, for example, stirring. Preferred examples of solvents usable in the preparation of the above-mentioned solution of the binary complex include a hydroxyl group-containing compound, a cyano group-containing compound, a carbonyl group-containing compound and a halogenated hydrocarbon.

The nitrogen-containing compound in the present invention is at least one member selected from the group consisting of at least one pyridine compound as mentioned below and a diamine represented by formula (1) above.

Examples of copper(I) halides used in the present invention include copper(I) chloride and copper(I) bromide.

The pyridine compound used in the present invention is at least one compound selected from pyridine and a pyridine derivative. Examples of pyridine compounds include pyridine, 3-methylpyridine, 4-methylpyridine and the like. Examples of diamines represented by the formula (1) include N,N,N',N'-tetramethyl-1,2-ethanediamine, N,N,N'-trimethyl-1,2-ethanediamine, N,N-dimethyl-1,2-ethanediamine, N,N,N'-triethyl-1,2-ethanediamine, N,N,N', N'-tetramethyl-1,3-propanediamine, N,N,N'-trimethyl-1,3-propanediamine, N,N-dimethyl-1,3-propanediamine, N,N'-dimethyl-1,3-propanediamine, N-methyl-1,3-propanediamine and the like.

Examples of hydroxy group-containing compounds, cyano group-containing compounds, and carbonyl group-containing compounds, each being usable as a solvent in producing the composite adsorbent of the present invention, include methanol, ethanol, acetonitrile, propionitrile, acetone, methylethylketone and the like. Examples of halogenated hydrocarbons usable as a solvent in producing the composite adsorbent of the present invention include methylene chloride and 1,2-dichloroethane.

In the adsorbent of the present invention for carbon monoxide, it is preferred that the molar ratio of the nitrogen-containing compound to the copper(I) halide is in the range of from 0.2 to 5.0.

The more preferred molar ratio of the nitrogen-containing compound to the copper(I) halide varies depending on the type of the nitrogen-containing compound. When the nitrogen-containing compound is the pyridine compound, the more preferred molar ratio [nitrogen-containing compound/copper(I) halide] is from 0.5 to 2.5. When the nitrogen-containing compound is the diamine represented by formula (1), the more preferred molar ratio [nitrogen-containing compound/copper(I) halide] is from 0.5 to 1.5.

A desired molar ratio of the nitrogen-containing compound to the copper(I) halide in the adsorbent can be achieved by adjusting the molar proportions of the nitrogen-containing compound and the copper(I) halide used in the production of the adsorbent.

Examples of materials for a porous inorganic carrier used in the present invention include silica gel, activated carbon, alumina, magnesia, zirconia, titania, silica-magnesia, zeolite, silica-alumina, and the like.

With respect to the above-mentioned various specific types of porous inorganic carriers, there is no particular limitation as long as they are those customarily employed as a carrier for an adsorbent in the art. Among the above-mentioned various types of porous inorganic carriers, silica gel and activated carbon are preferred.

With respect to the silica gel, either a natural silica gel or a synthesized silica gel may be used. However, a synthesized silica gel is preferred to a natural silica gel. Among synthesized silica gels, Xerogels are more preferred. Among Xerogels, crushed silica gel and spherical silica gel are preferred. It is preferred to use a silica gel having a specific surface area of from 50 to 800 $m^2/g$, an average pore diameter of from 2 to 70 nm and a particle size of from 3 to 50 Tyler mesh. Further, a water resistant silica gel is preferred.

With respect to the morphology of activated carbon, there is no particular limitation. For example, any of molded carbon, particulate carbon comprised of crushed carbon, and powdery carbon can be used. Examples of materials for producing activated carbon include wood, coconut palm shell, coal and petroleum pitch. Examples of methods for the activation of carbon include a chemical-activation method (wherein a carbonized material is impregnated with an aqueous solution of zinc chloride and subjected to calcination at high temperatures), and a gas-activation method (wherein a carbonized material is subjected to a steam treatment at high temperatures).

In the [nitrogen-containing compound/copper(I) halide binary complex]-porous inorganic carrier composite adsorbent of the present invention, the amount of the binary complex carried on the porous inorganic carrier is preferably in the range of from 0.2 to 10 mmol in terms of the molar amount of copper(I) in the binary complex per gram of the porous inorganic carrier.

The adsorbent of the present invention, which comprises the [nitrogen-containing compound/copper(I) halide] binary complex-porous inorganic carrier composite, is produced by contacting the porous inorganic carrier with a solution of the binary complex of a nitrogen-containing compound and a copper(I) halide in an organic solvent for the binary complex. Hereinbelow, the method of the present invention for producing the composite adsorbent will be described in detail. All operations described below are performed in an atmosphere of an inert gas, such as nitrogen gas.

A solution of the [nitrogen-containing compound/copper (I) halide] binary complex in a solvent therefor is prepared as follows. First, a solution of a copper(I) halide (concentration: 20 to 2,000 mmol/l; color: pale yellow) in a solvent therefor is prepared. Examples of solvents for a copper(I) halide include acetonitrile, methanol, ethanol, propionitrile, acetone, methyl ethyl ketone, methylene chloride, 1,2-dichloroethane and the like. To the obtained solution of a copper(I) halide, a nitrogen-containing compound selected from a pyridine compound and a diamine represented by the formula (1) is added in an amount of from 0.2 to 5.0 mol per mole of the copper(I) halide, and the resultant mixture is stirred or shaken at 0 to 90° C. for 30 minutes to 5 hours, to thereby obtain a solution of a [nitrogen-containing compound/copper(I) halide] binary complex. In this instance, when a pyridine compound is employed as the nitrogen-containing compound, the addition of a pyridine compound to the solution of the copper(I) halide causes the color of the solution to change from pale yellow to yellow. This change in the color of the solution indicates that a binary complex of a pyridine compound and a copper(I) chloride is formed. On the other hand, when a diamine represented by the formula (1) is employed as the nitrogen-containing compound, the addition of the diamine to the solution of the copper(I) halide causes the color of the solution to change from pale yellow to colorlessness (transparency), pale blue, blue or orange. This change in the color of the solution indicates that the [diamine/copper(I) halide] binary complex [wherein the diamine is represented by the formula (1)] is formed.

The above-obtained solution of the binary complex is added to 1 to 100% by weight, based on the weight of the solution of the binary complex, of a porous inorganic carrier. The resultant mixture is shaken or stirred at 0 to 90° C. for 30 minutes to 24 hours. Subsequently, the solvent is removed under reduced pressure. Then, the mixture is dried at 0 to 90° C. for 30 minutes to 5 hours under a pressure of 0.1–10 mmHg. Thus, the [nitrogen-containing compound/ copper(I) halide] binary complex-porous inorganic carrier composite adsorbent is obtained.

With respect to the above-obtained [nitrogen-containing compound/copper(I) halide] binary complex-porous inorganic carrier composite adsorbent, the amount of the [nitrogen-containing compound/copper(I) halide] binary complex carried on the porous inorganic carrier is determined, in accordance with the copper(I) thiocyanate method, in the following manner. As described above, for causing the binary complex to be carried on the porous inorganic carrier, a solution of the [nitrogen-containing compound/copper(I) halide] binary complex in an organic solvent is added to the porous inorganic carrier, and the resultant mixture is shaken or stirred, and then the solvent is removed under reduced pressure. In this instance, a part of the binary complex, which is not carried on the porous inorganic carrier, is deposited on the inner surface of a vessel used for the preparation of the composite. For determining the amount of the binary complex carried on the porous inorganic carrier, first, the amount of the binary complex which is not carried on the carrier but deposited on the inner surface of the vessel used is determined, as follows. To the deposited binary complex is added concentrated hydrochloric acid to dissolve the deposited binary complex. Thereafter, the resultant solution of the binary complex is diluted with water so that the total volume of the solution becomes 150 to 300 ml. 5 g of tartaric acid is added to the diluted solution and then, aqueous ammonia is added to the resultant solution to render the solution slightly alkaline. Further, an aqueous solution of sulfuric acid (sulfuric acid/ water volume ratio: 1/1) is added dropwise to the above-obtained slightly alkaline solution to neutralize the slightly alkaline solution and then, about 10 ml of the aqueous solution of sulfuric acid is further added in excess. Sodium sulfite is added to the resultant solution to reduce the copper(II) in the solution to copper(I). Then, the resultant mixture is heated to 60° C., and a 10% by weight aqueous solution of potassium thiocyanate containing sodium sulfite is added thereto until a precipitate of copper(I) thiocyanate is not further formed. The resultant mixture is heated to and kept at 60° C. for 1 hour and then allowed to stand until it is cooled to room temperature, to obtain a precipitate. The mixture is subjected to filtration using a filter (a cellulose membrane filter) which has been weighed in advance, to separate the precipitate. The obtained precipitate on the filter is washed 5 times with 10 ml of a 1% aqueous solution of ammonium nitrate and then washed 5 times with 10 ml of a 20% aqueous solution of ethanol, and then dried at 100° C. for 3 hours to thereby obtain dried copper(I) thiocyanate on the filter. The weight of the obtained copper(I) thiocyanate is measured. The difference between the molar amount of the copper(I) halide used for the production of the composite and the molar amount of the copper(I) thiocyanate determined above [wherein the copper(I) of the copper(I) thiocyanate is derived from the binary complex which is not carried on the carrier but deposited on the inner surface of the vessel used], is obtained. Based on the difference, the molar amount of the [nitrogen-containing compound/copper (I) halide] binary complex which is carried on the porous inorganic carrier is determined.

As mentioned above, in the composite adsorbent of the present invention [comprised of a porous inorganic carrier and, carried thereon, a binary complex of a nitrogen-containing compound and a copper(I) halide], the binary complex is carried on the porous inorganic carrier in an amount of from 0.2 to 10 mmol in terms of the molar amount of copper(I) in the binary complex per gram of the porous inorganic carrier.

When the above-mentioned [nitrogen-containing compound/copper(I) halide]-porous inorganic carrier composite adsorbent is contacted with a gaseous mixture containing carbon monoxide, the color of the composite adsorbent changes. Specifically, for example, when a diamine compound represented by the formula (1) is used as the nitrogen-containing compound and silica gel is used as the porous inorganic carrier, the color of the composite changes from pale blue, blue, violet, pale green or brown to blue, bluish green, green or brown upon being contacted with a carbon monoxide-containing gaseous mixture. When a pyridine compound is used as the nitrogen-containing compound and silica gel is used as the porous inorganic carrier, the color of the composite changes from yellow to pale green upon being contacted with a carbon monoxide-containing gaseous mixture. The above-mentioned change in the color of the composite indicates that carbon monoxide is coordinated to and is adsorbed on the [nitrogen-containing compound/copper(I) halide]-porous inorganic carrier composite. In other words, the adsorbent of the present invention for carbon monoxide, which comprises the [nitrogen-containing compound/copper(I) halide]-porous inorganic carrier composite, is very useful as an adsorbent for carbon monoxide, which has a high selectivity and an excellent adsorptive ability for carbon monoxide. In practice, the adsorbent of the present invention for carbon monoxide is contacted with a gaseous mixture containing carbon monoxide so as to adsorb the carbon monoxide thereon, to thereby separate the carbon monoxide from the gaseous mixture.

Differing from the above-mentioned conventional adsorbent comprising a pyridyl group-containing resin and, coordinated thereto, a copper(I) halide or the above-mentioned conventional adsorbent comprising an amino group-containing polystyrene resin and, coordinated thereto, a copper(I) halide, the adsorbent of the present invention for carbon monoxide has a structure in which a [nitrogen-containing compound/copper(I) halide] binary complex which serves as the active site for adsorption is carried on a carrier, wherein the binary complex and the carrier are separately prepared before causing the former to be carried on the latter. Therefore, in the adsorbent of the present invention, a large portion of the molecules of each of the nitrogen-containing compound and the copper(I) halide can participate in forming the adsorption active site in the adsorbent, and the density of the adsorption active sites on the carrier is high, so that the adsorbent of the present invention can extremely effectively adsorb carbon monoxide thereon, as compared to the conventional adsorbents in which a copper(I) halide is coordinated to a pyridyl group- or amino group-containing resin as a carrier.

Further, since conventional carriers, such as silica gel, activated carbon, zeolite and the like, which are widely used in the art, can be employed for producing the adsorbent of the present invention for carbon monoxide, the adsorbent of the present invention is advantageous from the economic viewpoint.

In another aspect of the present invention, there is provided a method for increasing the concentration of carbon monoxide in an atmosphere. In this method, a gaseous mixture containing carbon monoxide is contacted with the adsorbent of the present invention for carbon monoxide, and then the resultant carbon monoxide-adsorbed adsorbent is subjected to at least one treatment in an atmosphere, wherein the treatment is selected from the group consisting of heat treatment at 40° C. or more in a preselected atmosphere, exposure to a reduced pressure atmosphere and exposure to a carbon monoxide-depleted atmosphere, to thereby desorb and release the carbon monoxide from the adsorbent having adsorbed thereon the carbon monoxide into the atmosphere. By the above-mentioned method, the concentration of carbon monoxide in the atmosphere in which the adsorbent is treated can be efficiently increased. With respect to the above-mentioned preselected atmosphere, there is no particular limitation; however, as examples of preselected atmospheres, there can be mentioned a nitrogen atmosphere, a nitrogen atmosphere containing carbon monoxide in a small amount, and other carbon monoxide-depleted atmospheres.

In a further aspect of the present invention, there is provided a method for regenerating an adsorbent for carbon monoxide. In this method, a deteriorated adsorbent, which is produced by the contact of the adsorbent of the present invention with an oxygen-containing gas, such as the air and which is deteriorated with respect to the adsorptive and desorptive ability for carbon monoxide, is treated with a reducing agent. Examples of reducing agents include reducing gases, such as hydrogen, carbon monoxide and the like, and liquids and solids both having reducing ability, such as hydroquinone, phenol and the like.

With respect to the above-mentioned method for regenerating an adsorbent for carbon monoxide, detailed explanation is made below. When an accident occurs in which the adsorbent of the present invention for carbon monoxide happens to contact an oxygen-containing gas, such as the air, by mistake before use for adsorbing carbon monoxide, the adsorbent for carbon monoxide becomes deteriorated with respect to the adsorptive and desorptive ability for carbon monoxide. The reason why the adsorbent is deteriorated by contact with an oxygen-containing gas resides in that the [nitrogen-containing compound/copper(I) halide] binary complex carried on the porous inorganic carrier is oxidized by oxygen, and the resultant oxidized complex cannot coordinates carbon monoxide thereto. As a result of the above-mentioned oxidation reaction of the binary complex with oxygen, the color of the adsorbent changes. The mode of the change in the color of the adsorbent varies depending on the type of the binary complex used in the adsorbent. For example, with respect to the [pyridine compound/copper(I) halide] binary complex-silica gel composite adsorbent, the color of the adsorbent changes from yellow to pale green or black upon being contacted with oxygen. On the other hand, with respect to the [diamine/copper(I) halide] binary complex-silica gel composite adsorbent, the color of the adsorbent changes from pale blue, blue, violet, pale green or brown to pale blue, pale green or black upon being contacted with oxygen.

The adsorbent which has been deteriorated by the contact thereof with an oxygen-containing gas can be regenerated by treating it with a reducing agent. Specifically, for example, the treatment with a reducing agent can be performed by a treating method in which the deteriorated adsorbent is heated at 100 to 150° C. in an atmosphere of a reducing gas (under 1 atm), such as carbon monoxide or hydrogen, and then, is subjected to a reduced pressure treatment at 0 to 90° C. under a pressure of from 0.1 to 10 mmHg, or a treating method in which a solution of a reducing agent, such as hydroquinone, phenol, catechol, sodium citrate or the like, is added to the deteriorated adsorbent in an amount of from 0.2 to 6.0 mol per mol of the copper(I) halide used for the preparation of the composite adsorbent, and the resultant mixture is stirred or shaked at 0 to 90° C. for 30 minutes to 24 hours, whereupon the reducing agent solution is removed from the mixture, followed by vacuum-drying at 0 to 90° C. When a composite adsorbent comprising a porous inorganic carrier and the [pyridine compound/copper(I) halide] binary complex, wherein silica gel, titania or the like is used as the porous inorganic carrier, is treated with a reducing agent in a solution or gaseous form in the above-mentioned manner for regeneration, the color of the adsorbent changes to pale blue, gray or brown. When a composite adsorbent comprising a porous inorganic carrier and the [diamine/copper(I) halide] binary complex, wherein silica gel, titania or the like is used as the porous inorganic carrier, is treated with a reducing agent in a solution or gaseous form in the above-mentioned manner for regeneration, the color of the adsorbent changes to pale blue or brown. Examples of solvents for use in preparing the above-mentioned solution of a reducing agent (such as hydroquinone, phenol or the like) include methanol, acetonitrile, diethyl ether, methyl ethyl ketone and the like.

By the above-mentioned treatment of the deteriorated adsorbent with a reducing agent, the oxidized binary complex produced by the contact of the adsorbent of the present invention with an oxygen-containing gas is reduced, so that the adsorptive and desorptive ability of the deteriorated adsorbent is recovered to substantially the same level as exerted before the contact with the oxygen-containing gas.

In the present invention, the adsorption of carbon monoxide is conducted by contacting a carbon monoxide-containing gas (having a carbon monoxide content of from 1 to 100% by volume) with the adsorbent of the present invention at a temperature of from 0 to 50° C. under a pressure of from 0.5 to 5 atm. The carbon monoxide adsorbed on the adsorbent of the present invention for carbon monoxide can be easily desorbed and released from the adsorbent by subjecting the adsorbent to at least one treatment selected from the group consisting of heat treatment at 40 to 150° C. in a preselected atmosphere, exposure to a reduced pressure atmosphere of from 0.1 to 100 mmHg, and exposure to a carbon monoxide-depleted atmosphere (for example, an atmosphere having a carbon monoxide partial pressure of from 0 to 40%). Further, by selecting an appropriate combination among the above-mentioned treatments, the desorption of carbon monoxide from the carbon monoxide-adsorbed adsorbent can be performed under more moderate conditions with respect to temperature, reduced pressure and carbon monoxide partial pressure, so that the carbon monoxide concentration of the atmosphere, in which the operation for desorption of carbon monoxide from the carbon monoxide-adsorbed adsorbent is conducted, can be increased more effectively and efficiently.

Since the adsorbent of the present invention for carbon monoxide is in the solid state, it can be handled with ease, and can be used in a packed column type or fluidized bed type carbon monoxide-separating apparatus.

In the method of the present invention for producing an adsorbent for carbon monoxide, there is no danger of the occurrence of corrosion of the production apparatus and the like, since hydrochloric acid is not used as a solvent. The method of the present invention for producing an adsorbent uses an organic solvent, which has a small latent heat of evaporation, so that the method of the present invention for producing an adsorbent is advantageous in that the energy required for heating and vacuum distillation is small, as compared to a method in which hydrochloric acid or water is used as a solvent. Further, in the method of the present invention for producing an adsorbent, a solvent can be recovered and recycled, so that the method is also advantageous from the viewpoint of the saving of resources. Therefore, the adsorbent of the present invention and the method of the present invention for producing the adsorbent have very great advantages from a commercial point of view.

BEST MODE FOR CARRYING OUT THE INVENTION

The present invention will be described in more detail with reference to Examples and Comparative Examples, which should not be construed as limiting the scope of the present invention.

In the following Examples and Comparative Examples, all operations were conducted at room temperature under atmospheric pressure, unless otherwise specified.

EXAMPLE 1

Copper(I) chloride, pyridine, acetonitrile, activated carbon, carbon monoxide and nitrogen, each for use in this Example, were prepared as follows.
Copper(I) chloride
Copper(I) chloride (a special grade reagent, manufactured and sold by Kanto Chemical Co., Ltd., Japan) was dissolved in concentrated hydrochloric acid. The resultant solution was added dropwise to distilled water to reprecipitate the copper(I) chloride. The resultant precipitate was washed with ethanol and then with diethyl ether, and dried at 60° C. for 12 hours in vacuo. Thus, purified copper(I) chloride was obtained.

Pyridine
Pyridine (a special grade reagent, manufactured and sold by Tokyo Kasei Kogyo Co., Ltd., Japan) was dried over sodium hydroxide. The dried pyridine was distilled over calcium hydride before use.
Acetonitrile
Acetonitrile (a special grade reagent, manufactured and sold by Kanto Chemical Co., Ltd., Japan) was dried with molecular sieve 4A, and the dried acetonitrile was distilled under atmospheric pressure.
Activated carbon
Activated carbon [BAC, G-70R, manufactured and sold by Kureha Chemical Industry Co., Ltd., Japan (particle diameter: about 0.7 mm, color: black)] was evacuated at 150° C. for 12 hours under a pressure of 0.1 mmHg.
Carbon monoxide
Carbon monoxide [from a pure carbon monoxide bomb manufactured and sold by Nihon Sanso K.K., Japan (purity: not less than 99.95%)] was dried and purified by passing it through a column packed with molecular sieve 3A just before use.
Nitrogen
Nitrogen (pure gas B) [from a pure nitrogen bomb manufactured and sold by Nihon Sanso K.K., Japan (purity: not less than 99.9995%)] as such was used without further purification.

In a 50-ml one-neck eggplant type flask which had been purged with nitrogen gas was placed 0.38 g (3.8 mmol) of copper(I) chloride, and 7.5 ml of acetonitrile was added as a solvent, to thereby obtain a pale yellow solution. 0.33 ml (4.1 mmol) of pyridine (colorless) was added to the above-obtained solution, and the resultant mixture was stirred for 1 hour by means of a magnetic stirrer, to thereby obtain a yellow solution.

This change in the color of the solution indicated that a binary complex of pyridine and copper(I) chloride was formed.

2.5 g of activated carbon was placed in an eggplant type flask, and the above-obtained solution of the binary complex of pyridine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a black composite comprising the activated carbon having carried thereon the binary complex of pyridine and copper(I) chloride was obtained.

With respect to the obtained composite, the amount of the binary complex of pyridine and copper(I) chloride carried on the activated carbon was determined in accordance with the above-mentioned copper(I) thiocyanate method. As a result, it was found that the amount of the pyridine/copper(I) chloride complex in the composite was 1.18 mmol per gram of the composite.

3.2 g of the intact composite obtained above was placed in a 50-ml one-neck eggplant type flask. The inside of the one-neck eggplant type flask was evacuated at 30° C. to a pressure of 0.1 mmHg. The one-neck eggplant type flask was connected to a container, containing 600 ml (under 1 atm.) of pure carbon monoxide, through a glass tube having an inner diameter of 12 mm which was equipped with a two-way stop-cock (Standard # 15, hole diameter of the plug: 3 mm). The carbon monoxide was diffused into the one-neck eggplant type flask containing the composite by opening the two-way stop-cock, so that the carbon monoxide was contacted with the composite at 30° C. The amount of carbon monoxide adsorbed on the composite was determined by the gas burette method.

The composite obtained in this Example 1 showed rapid adsorption of carbon monoxide. That is, the amount of carbon monoxide adsorbed on the composite was 2.30 mmol in 1 minute, 2.63 mmol in 3 minutes, 2.68 mmol in 5 minutes, and 2.71 mmol in 10 minutes, cumulatively. The adsorption reached equilibrium 10 minutes after the start of contact of the composite with carbon monoxide. The results showed that the amount of carbon monoxide adsorbed in 10 minutes was 0.85 mmol per gram of the composite. (first adsorption experiment)

3.2 g of the resultant composite having adsorbed thereon carbon monoxide was placed in a 50-ml one-neck eggplant type flask, and the flask was evacuated at 30° C. to and maintained at a pressure of 0.3 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that almost the same amount (2.67 mmol) of carbon monoxide as in the first adsorption experiment was adsorbed on the composite.

Substantially the same adsorption and desorption experiments as mentioned above were repeated. Despite the repeated use of the composite, the composite showed almost no change in the rate and amount of adsorption of carbon monoxide on the composite.

On the other hand, 3.2 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 1.50 mmol in 1 minute and 1.54 mmol in 3 minutes, cumulatively. The desorption of carbon monoxide from the composite reached equilibrium 3 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (1.54 mmol) of carbon monoxide as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

EXAMPLE 2

In Example 2, use was made of the same copper(I) chloride, pyridine, acetonitrile, carbon monoxide and nitrogen as used in Example 1. Silica gel, carbon dioxide and methane, each for use in this Example, were prepared as follows.

Silica gel

Silica gel [CARiACT-Q 10, manufactured and sold by Fuji Silysia Chemical, Ltd., Japan (average pore diameter: 10 nm, specific surface area: 300 $m^2/g$, particle size: 5 to 10 mesh, Tyler, appearance: colorless and transparent)] was immersed in 1N hydrochloric acid for 24 hours. The immersion-treated silica gel was repeatedly washed with distilled water by decantation until the supernatant became neutral, and then vacuum dried at 150° C. under a pressure of 0.1 mmHg for 12 hours.

Carbon dioxide

Carbon dioxide [from a pure carbon dioxide bomb manufactured and sold by Nihon Sanso K.K., Japan (purity: not less than 99.99%)] as such was used without further purification.

Methane

Methane [standard methane packed in a spray type container, manufactured and sold by Nihon Sanso K.K., Japan (purity: not less than 99.7%)] as such was used without further purification.

In a 50-ml one-neck eggplant type flask which had been purged with nitrogen gas was placed 0.49 g (5.0 mmol) of copper(I) chloride, and 10 ml of acetonitrile was added as a solvent, to thereby obtain a pale yellow solution. 0.44 ml (5.5 mmol) of pyridine (colorless) was added to the solution, and the resultant mixture was stirred for 1 hour by means of a magnetic stirrer in substantially the same manner as in Example 1, to thereby obtain a yellow solution of a binary complex of pyridine and copper(I) chloride.

5.0 g of silica gel was placed in an eggplant type flask, and the above-obtained solution of the binary complex of pyridine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a composite comprising the silica gel having carried thereon the binary complex of pyridine and copper(I) chloride was obtained. The composite had uniform yellow color.

With respect to the obtained composite, the amount of the binary complex of pyridine and copper(I) chloride carried on the silica gel was determined in accordance with the above-mentioned copper(I) thiocyanate method. As a result, it was found that the amount of the pyridine/copper(I) chloride complex in the composite was 0.73 mmol per gram of the composite.

5.7 g of the intact composite obtained above was placed in a 50-ml one-neck eggplant type flask. The inside of the one-neck eggplant type flask was evacuated at 30° C. to a pressure of 0.1 mmHg. The one-neck eggplant type flask was connected to a container, containing 600 ml (under 1 atm.) of pure carbon monoxide, through a glass tube having an inner diameter of 12 mm which was equipped with a two-way stop-cock (Standard # 15, hole diameter of the plug: 3 mm). The carbon monoxide was diffused into the one-neck eggplant type flask containing the composite by opening the two-way stop-cock, so that the carbon monoxide was contacted with the composite at 30° C. The amount of carbon monoxide adsorbed on the composite was determined by the gas burette method.

The composite obtained in this Example 2 showed rapid adsorption of carbon monoxide. That is, the amount of carbon monoxide adsorbed on the composite was 2.57 mmol in 1 minute, 3.00 mmol in 3 minutes, 3.17 mmol in 5 minutes, and 3.29 mmol in 10 minutes, cumulatively. The adsorption reached equilibrium 10 minutes after the start of contact of the composite with carbon monoxide. The results showed that the amount of carbon monoxide adsorbed in 10 minutes was 0.58 mmol per gram of the composite. (first adsorption experiment).

5.8 g of the resultant composite having adsorbed thereon carbon monoxide was placed in a 50-ml one-neck eggplant type flask, and the flask was evacuated at 30° C. to and maintained at a pressure of 0.4 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that almost the same amount (3.29 mmol) of carbon monoxide as in the first adsorption experiment was adsorbed on the composite.

Substantially the same adsorption and desorption experiments as mentioned above were repeated. Despite the repeated use of the composite, the composite showed almost no change in the rate and amount of adsorption of carbon monoxide on the composite.

On the other hand, 5.8 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 1.54 mmol in 1 minute, 1.90 mmol in 3 minutes, 2.02 mmol in 5 minutes and 2.11 mmol in 10 minutes, cumulatively. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount of carbon monoxide (2.11 mmol) as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

5.7 g of the same intact composite as obtained above was contacted with carbon dioxide in substantially the same manner as mentioned above so as to adsorb carbon dioxide thereon. As a result, the composite adsorbed thereon 0.61 mmol of carbon dioxide in 10 minutes.

This means that the adsorptive ability of the composite for carbon monoxide is as high as 5.4 times that for carbon dioxide, so that the composite has the ability to separate carbon monoxide by adsorption from a gaseous mixture of carbon monoxide and carbon dioxide.

5.7 g of the same intact composite as obtained above was contacted with methane in substantially the same manner as mentioned above so as to adsorb methane thereon. As a result, the composite adsorbed thereon 0.08 mmol of methane in 10 minutes.

This means that the adsorptive ability of the composite for carbon monoxide is as high as 41 times that for methane, so that the composite has the ability to separate carbon monoxide by adsorption from a gaseous mixture of carbon monoxide and methane.

EXAMPLE 3

In Example 3, use was made of the same copper(I) chloride, acetonitrile, activated carbon, carbon monoxide and nitrogen as used in Example 1. N,N,N',N'-tetramethyl-1,2-ethanediamine for use in this Example was prepared as follows.

N,N,N',N'-tetramethyl-1,2-ethanediamine

N,N,N',N'-tetramethyl-1,2-ethanediamine (a special grade reagent, manufactured and sold by Tokyo Kasei Kogyo Co., Ltd., Japan) was dried over calcium hydride (a first grade reagent, manufactured and sold by Nacalai Tesque, Japan), and then distilled under reduced pressure.

In a 50-ml one-neck eggplant type flask which had been purged with nitrogen gas was placed 0.38 g (3.8 mmol) of copper(I) chloride, and 7.5 ml of acetonitrile was added as a solvent, to thereby obtain a pale yellow solution. 0.62 ml (4.1 mmol) of N,N,N',N'-tetramethyl-1,2-ethanediamine (colorless) was added to the solution, and the resultant mixture was stirred for 1 hour by means of a magnetic stirrer, to thereby obtain a colorless solution.

This change in the color of the solution indicated that a binary complex of N,N,N',N'-tetramethyl-1,2-ethanediamine and copper(I) chloride was formed.

2.5 g of activated carbon was placed in an eggplant type flask, and the above-obtained solution of the binary complex of N,N,N',N'-tetramethyl-1,2-ethanediamine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a black composite comprising the activated carbon having carried thereon the binary complex of N,N,N',N'-tetramethyl-1,2-ethanediamine and copper(I) chloride was obtained.

With respect to the obtained composite, the amount of the binary complex of N,N,N',N'-tetramethyl-1,2-ethanediamine and copper(I) chloride carried on the activated carbon was determined in accordance with the above-mentioned copper(I) thiocyanate method. As a result, it was found that the amount of the N,N,N',N'-tetramethyl-1,2-ethanediamine/copper(I) chloride complex in the composite was 1.10 mmol per gram of the composite.

3.3 g of the intact composite obtained above was placed in a 50-ml one-neck eggplant type flask. The inside of the one-neck eggplant type flask was evacuated at 30° C. to a pressure of 0.1 mmHg. The one-neck eggplant type flask was connected to a container, containing 600 ml (under 1 atm.) of pure carbon monoxide, through a glass tube having an inner diameter of 12 mm which was equipped with a two-way stop-cock (Standard # 15, hole diameter of the plug: 3 mm). The carbon monoxide was diffused into the one-neck eggplant type flask containing the composite by opening the two-way stop-cock, so that the carbon monoxide was contacted with the composite at 30° C. The amount of carbon monoxide adsorbed on the composite was determined by the gas burette method.

The composite obtained in this Example 3 showed rapid adsorption of carbon monoxide. That is, the amount of carbon monoxide adsorbed on the composite was 2.86 mmol in 1 minute, 3.05 mmol in 3 minutes, 3.09 mmol in 5 minutes, and 3.11 mmol in 10 minutes, cumulatively. The adsorption reached equilibrium 10 minutes after the start of contact of the composite with carbon monoxide. The results showed that the amount of carbon monoxide adsorbed in 10 minutes was 0.94 mmol. (first adsorption experiment)

3.3 g of the resultant composite having adsorbed thereon carbon monoxide was placed in a 50-ml one-neck eggplant type flask, and the flask was evacuated at 30° C. and maintained at a pressure of 0.2 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. The amount of carbon monoxide adsorbed on the composite was 2.36 mmol in 1 minute, 2.46 mmol in 3 minutes, 2.47 mmol in 5 minutes, and 2.48 mmol in 10 minutes, cumulatively. The adsorption reached equilibrium 10 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

On the other hand, 3.3 g of the same composite (having adsorbed thereon carbon monoxide) as obtained in the first adsorption experiment was heated to 120° C. under a pressure of 1 atm. Rapid desorption of the carbon monoxide occurred. That is, the amount of carbon monoxide desorbed from the composite was 1.61 mmol in 1 minute and 1.63 mmol in 3 minutes, cumulatively. The desorption of carbon monoxide from the composite reached equilibrium 3 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (1.63 mmol) of carbon monoxide as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

EXAMPLE 4

In Example 4, use was made of the same copper(I) chloride, acetonitrile, carbon monoxide and nitrogen as used in Example 1. Use was made of the same silica gel, carbon dioxide and methane as used in Example 2. Use was made of the same N,N,N',N'-tetramethyl-1,2-ethanediamine as used in Example 3.

In a 50-ml one-neck eggplant type flask which had been purged with nitrogen gas was placed 0.49 g (5.0 mmol) of copper(I) chloride, and 10 ml of acetonitrile was added as a solvent, to thereby obtain a pale yellow solution. 0.83 ml (5.5 mmol) of N,N,N',N'-tetramethyl-1,2-ethanediamine (colorless) was added to the solution, and the resultant mixture was stirred for 1 hour by means of a magnetic stirrer, to thereby obtain a colorless solution of a binary complex of N,N,N',N'-tetramethyl-1,2-ethanediamine and copper(I) chloride. 5.0 g of silica gel was placed in an eggplant type flask, and the above-obtained solution of the binary complex of N,N,N',N'-tetramethyl-1,2-ethanediamine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a composite comprising the silica gel having carried thereon the binary complex of N,N,N',N'-tetramethyl-1,2-ethanediamine and copper(I) chloride was obtained. The composite had uniform pale blue color.

With respect to the obtained composite, the amount of the binary complex of N,N,N',N'-tetramethyl-1,2-ethanediamine and copper(I) chloride carried on the silica gel was determined in accordance with the above-mentioned copper(I) thiocyanate method. As a result, it was found that the amount of the N,N,N', N'-tetramethyl-1,2-ethanediamine/copper(I) chloride complex in the composite was 0.81 mmol per gram of the composite.

6.0 g of the intact composite obtained above was placed in a 50-ml one-neck eggplant type flask. The inside of the one-neck eggplant type flask was evacuated at 30° C. to a pressure of 0.1 mmHg. The one-neck eggplant type flask was connected to a container, containing 600 ml (under 1 atm.) of pure carbon monoxide, through a glass tube having an inner diameter of 12 mm which was equipped with a two-way stop-cock (Standard # 15, hole diameter of the plug: 3 mm). The carbon monoxide was diffused into the one-neck eggplant type flask containing the composite by opening the two-way stop-cock, so that the carbon monoxide was contacted with the composite at 30° C. The amount of carbon monoxide adsorbed on the composite was determined by the gas burette method.

The composite obtained in this Example 4 showed rapid adsorption of carbon monoxide. That is, the amount of carbon monoxide adsorbed on the composite was 3.92 mmol in 1 minute, 4.16 mmol in 3 minutes, 4.23 mmol in 5 minutes, and 4.27 mmol in 10 minutes, cumulatively. The adsorption reached equilibrium 10 minutes after the start of contact of the composite with carbon monoxide. The results showed that the amount of carbon monoxide adsorbed in 10 minutes was 0.71 mmol per gram of the composite. (first adsorption experiment)

6.1 g of the resultant composite having adsorbed thereon carbon monoxide was placed in a 50-ml one-neck eggplant type flask, and the flask was evacuated at 30° C. and maintained at a pressure of 0.6 mmHg for 10 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. The amount of carbon monoxide adsorbed on the composite was 2.88 mmol in 1 minute, 3.04 mmol in 3 minutes, 3.12 mmol in 5 minutes, and 3.15 mmol in 10 minutes, cumulatively. The adsorption reached equilibrium 10 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

On the other hand, 6.1 g of the same composite (having adsorbed thereon carbon monoxide) as obtained in the first adsorption experiment was placed in a 50-ml one-neck eggplant type flask, and the flask was evacuated at 30° C. to and maintained at a pressure of 0.1 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 3.61 mmol in 1 minute, 3.81 mmol in 3 minutes, 3.88 mmol in 5 minutes, and 3.91 mmol in 10 minutes, cumulatively. The adsorption reached equilibrium 10 minutes after the start of contact of the composite with the carbon monoxide. Substantially the same adsorption and desorption experiments as mentioned above were repeated. Despite the repeated use of the composite, the composite showed almost no change in the rate and amount of adsorption of carbon monoxide on the composite.

Further, 6.1 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 0.69 mmol in 1 minute, 0.79 mmol in 3 minutes, 0.81 mmol in 5 minutes, and 0.83 mmol in 10 minutes, cumulatively. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment, so as to adsorb again carbon monoxide thereon. As a result, it was found that the same amount (0.83 mmol) of carbon monoxide as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

Another experiment on the desorption by heat treatment was carried out. 6.1 g of the same composite (having adsorbed thereon carbon monoxide) as obtained in the first adsorption experiment was heated to 120° C. under a pressure of 1 atm. Rapid desorption of the carbon monoxide occurred. That is, the amount of carbon monoxide desorbed from the composite was 3.06 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (3.06 mmol) of carbon monoxide as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

6.0 g of the same intact composite as obtained above was contacted with carbon dioxide in substantially the same manner as mentioned above so as to adsorb carbon dioxide thereon. As a result, the composite adsorbed thereon 0.45 mmol of carbon dioxide in 10 minutes.

This means that the adsorptive ability of the composite for carbon monoxide is as high as 9.5 times that for carbon dioxide, so that the composite has the ability to separate carbon monoxide by adsorption from a gaseous mixture of carbon monoxide and carbon dioxide.

6.0 g of the same intact composite as obtained above was contacted with methane in substantially the same manner as mentioned above so as to adsorb methane thereon. As a result, the composite adsorbed thereon 0.10 mmol of methane in 10 minutes.

This means that the adsorptive ability of the composite for carbon monoxide is as high as 42.7 times that for methane, so that the composite has the ability to separate carbon monoxide by adsorption from a gaseous mixture of carbon monoxide and methane.

EXAMPLE 5

Production of a composite was performed in substantially the same manner as in Example 1, except that use was made of 4.1 mmol of 3-methylpyridine (a special grade reagent, manufactured and sold by Tokyo Kasei Kogyo Co., Ltd., Japan) instead of pyridine, to thereby obtain a black composite comprising activated carbon having carried thereon a binary complex of 3-methylpyridine and copper(I) chloride.

Using 3.2 g of the composite obtained above, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 2.20 mmol in 1 minute, 2.50 mmol in 3 minutes, 2.54 mmol in 5 minutes, and 2.57 mmol in 10 minutes, cumulatively. The adsorption reached equilibrium 10 minutes after the start of contact of the composite with carbon monoxide. (first adsorption experiment)

The resultant composite having adsorbed thereon carbon monoxide was placed in a 50-ml one-neck eggplant type flask, and the flask was evacuated at 30° C. to and maintained at a pressure of 0.4 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that almost the same amount (2.54 mmol) of carbon monoxide as in the first adsorption experiment was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 6

Production of a composite was performed in substantially the same manner as in Example 2, except that use was made of 1.98 g (20.0 mmol) of copper(I) chloride, 1.78 ml (22.0 mmol) of pyridine and 40 ml of acetonitrile, to thereby obtain a composite comprising silica gel having carried thereon a binary complex of pyridine and copper(I) chloride. The obtained composite had deeper yellow color than the yellow color of the composite obtained in Example 2.

With respect to the obtained composite, the amount of the binary complex of pyridine and copper(I) chloride carried on the silica gel was determined in accordance with the above-mentioned copper(I) thiocyanate method. As a result, it was found that the amount of the pyridine/copper(I) chloride complex in the composite was 1.19 mmol per gram of the composite.

Using 6.3 g of the intact composite obtained above, an adsorption experiment for carbon monoxide was conducted and the amount of the carbon monoxide adsorbed on the composite was determined in the same manner as in Example 1. The composite showed rapid adsorption of carbon monoxide. That is, the amount of carbon monoxide adsorbed on the composite was 3.48 mmol in 1 minute, 4.29 mmol in 3 minutes, 4.70 mmol in 5 minutes, and 5.06 mmol in 10 minutes, cumulatively. The adsorption reached equilibrium 10 minutes after the start of contact of the composite with carbon monoxide. The results showed that the amount of carbon monoxide adsorbed in 10 minutes was 0.80 mmol per gram of the composite.

Using 6.3 g of the same intact composite as obtained above, an adsorption experiment for carbon dioxide was conducted and the amount of carbon dioxide adsorbed on the composite was determined in the same manner as described above. As a result, the composite adsorbed thereon 0.48 mmol of carbon dioxide in 10 minutes.

This means that the adsorptive ability of the composite for carbon monoxide is as high as 11 times that for carbon dioxide, so that the composite has the ability to separate carbon monoxide by adsorption from a gaseous mixture of carbon monoxide and carbon dioxide.

As apparent from the above, the ability of the composite to separate carbon monoxide by adsorption from a gaseous mixture of carbon monoxide and carbon dioxide can be enhanced by increasing the amount of the pyridine/copper(I) chloride complex carried on the silica gel.

EXAMPLE 7

Production of a composite was performed in substantially the same manner as in Example 3, except that use was made of 4.1 mmol of N,N,N'-trimethyl-1,2-ethanediamine (a first grade reagent, manufactured and sold by Tokyo Kasei Kogyo Co., Ltd., Japan) instead of N,N,N',N'-tetramethyl-1,2-ethanediamine, to thereby obtain a black composite comprising activated carbon having carried thereon a binary complex of N,N,N'-trimethyl-1,2-ethanediamine and copper (I) chloride.

Using 3.2 g of the composite obtained above, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 3.21 mmol in 1 minute, 3.44 mmol in 3 minutes, 3.51 mmol in 5 minutes, and 3.56 mmol in 10 minutes, cumulatively. The adsorption reached equilibrium 10 minutes after the start of contact of the composite with carbon monoxide.

The resultant composite having adsorbed thereon carbon monoxide was placed in a 50-ml one-neck eggplant type flask, and the flask was evacuated at 30° C. to and maintained at a pressure of 0.3 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 2.79 mmol in 1 minute, 2.98 mmol in 3 minutes, and 3.00 mmol in 5 minutes, cumulatively. The adsorption reached equilibrium 5 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

EXAMPLE 8

Production of a composite was performed in substantially the same manner as in Example 4, except that use was made of 1.98 g (20.0 mmol) of copper(I) chloride, 3.32 ml (22.0 mmol) of N,N,N',N'-tetramethyl-1,2-ethanediamine and 40 ml of acetonitrile, to thereby obtain a composite comprising silica gel having carried thereon a binary complex of N,N, N',N'-tetramethyl-1,2-ethanediamine and copper(I) chloride. The obtained composite had deeper blue color than the blue color of the composite obtained in Example 4.

With respect to the obtained composite, the amount of the binary complex of N,N,N',N'-tetramethyl-1,2-ethanediamine and copper(I) chloride carried on the silica gel was determined in accordance with the above-mentioned copper(I) thiocyanate method. As a result, it was found that the amount of the N,N,N',N'-tetramethyl-1,2-ethanediamine/copper(I) chloride complex in the composite was 1.78 mmol per gram of the composite.

Using 7.3 g of the intact composite obtained above, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 8.29 mmol in 1 minute, 8.95 mmol in 3 minutes, 9.20 mmol in 5 minutes, and 9.51 mmol in 10 minutes, cumulatively. The adsorption reached equilibrium about 10 minutes after the start of contact of the composite with carbon monoxide. The results showed that the amount of carbon monoxide adsorbed in 10 minutes was 1.30 mmol per gram of the composite.

Using 7.3 g of the same intact composite as obtained above, an adsorption experiment for carbon dioxide was conducted and the amount of carbon dioxide adsorbed on the composite was determined in the same manner as described above. As a result, the composite adsorbed thereon 0.44 mmol of carbon dioxide in 10 minutes.

This means that the adsorptive ability of the composite for carbon monoxide is as high as 22 times that for carbon dioxide, so that the composite has the ability to separate carbon monoxide by adsorption from a gaseous mixture of carbon monoxide and carbon dioxide.

As apparent from the above, the ability of the composite to separate carbon monoxide by adsorption from a gaseous mixture of carbon monoxide and carbon dioxide can be enhanced by increasing the amount of the N,N,N',N'-tetramethyl-1,2-ethanediamine/copper(I) chloride complex carried on the silica gel.

EXAMPLE 9

Production of a composite was performed in substantially the same manner as in Example 1, except that use was made of 4.1 mmol of 4-methylpyridine (a first grade reagent, manufactured and sold by Tokyo Kasei Kogyo Co., Ltd., Japan) instead of pyridine, to thereby obtain a black composite comprising activated carbon having carried thereon a binary complex of 4-methylpyridine and copper(I) chloride.

Using 3.2 g of the composite obtained above, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 2.11 mmol in 1 minute, 2.46 mmol in 3 minutes, 2.51 mmol in 5 minutes, and 2.54 mmol in 10 minutes, cumulatively. The adsorption reached equilibrium 10 minutes after the start of contact of the composite with carbon monoxide. (first adsorption experiment)

The resultant composite having adsorbed thereon carbon monoxide was placed in a 50-ml one-neck eggplant type flask, and the flask was evacuated at 30° C. to and maintained at a pressure of 0.3 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that almost the same amount (2.48 mmol) of carbon monoxide as in the first adsorption experiment was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 10

Production of a composite was performed in substantially the same manner as in Example 2, except that use was made of 5.5 mmol of 3-methylpyridine (a special grade reagent, manufactured and sold by Tokyo Kasei Kogyo Co., Ltd., Japan) instead of pyridine, to thereby obtain a composite comprising silica gel having carried thereon a binary complex of 3-methylpyridine and copper(I) chloride. The composite had uniform yellow color.

With respect to the obtained composite, the amount of the binary complex of 3-methylpyridine and copper(I) chloride carried on the silica gel was determined in accordance with the above-mentioned copper(I) thiocyanate method. As a result, it was found that the amount of the 3-methylpyridine/copper(I) chloride complex in the composite was 0.81 mmol per gram of the composite.

Using 5.9 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount carbon monoxide adsorbed on the composite was 2.88 mmol in 1 minute, 3.37 mmol in 3 minutes, 3.56 mmol in 5 minutes, and 3.70 mmol in 10 minutes, cumulatively. The adsorption reached equilibrium 10 minutes after the start of contact of the composite with carbon monoxide. The results showed that the amount of carbon monoxide adsorbed in 10 minutes was 0.63 mmol per gram of the composite. (first adsorption experiment)

6.0 g of the resultant composite having adsorbed thereon carbon monoxide was placed in a 50-ml one-neck eggplant type flask, and the flask was evacuated at 30° C. to and maintained at a pressure of 0.4 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the same amount (3.70 mmol) of carbon monoxide as in the first adsorption experiment was adsorbed on the composite.

Substantially the same adsorption and desorption experiments as mentioned above were repeated. Despite the repeated use of the composite, the composite showed almost no change in the rate and amount of adsorption of carbon monoxide on the composite.

On the other hand, 6.0 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 2.40 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (2.40 mmol) of carbon monoxide as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

EXAMPLE 11

Production of a composite was performed in substantially the same manner as in Example 3, except that use was made of 4.1 mmol of N,N,N',N'-tetramethyl-1,3-propanediamine (a special grade reagent, manufactured and sold by Tokyo Kasei Kogyo Co., Ltd., Japan) instead of N,N,N',N'-tetramethyl-1,2-ethanediamine, to thereby obtain a black composite comprising activated carbon having carried thereon a binary complex of N,N,N',N'-tetramethyl-1,3-propanediamine and copper(I) chloride.

Using 3.3 g of the above-obtained composite, an adsorption experiment for carbon monoxide was conducted and the amount of carbon monoxide adsorbed on the composite was determined in substantially the same manner as in Example 1. The amount of carbon monoxide adsorbed on the composite was 2.77 mmol in 1 minute, 3.02 mmol in 3 minutes, 3.05 mmol in 5 minutes, and 3.07 mmol in 10 minutes, cumulatively. The adsorption reached equilibrium 10 minutes after the start of contact of the composite with carbon monoxide.

The resultant composite having adsorbed thereon carbon monoxide was placed in a 50-ml one-neck eggplant type flask, and the flask was evacuated at 30° C. to and maintained at a pressure of 0.3 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 2.59 mmol in 1 minute, 2.78 mmol in 3 minutes, and 2.79 mmol in 5 minutes, cumulatively. The adsorption reached equilibrium 5 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

EXAMPLE 12

Production of a composite was performed in substantially the same manner as in Example 4, except that use was made of 5.5 mmol of N,N,N'-trimethyl-1,2-ethanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising silica gel having carried thereon a binary complex of N,N,N'-trimethyl-1,2-ethanediamine and copper(I) chloride. The composite had uniform pale blue color.

With respect to the obtained composite, the amount of the binary complex of N,N,N'-trimethyl-1,2-ethanediamine and copper(I) chloride carried on the silica gel was determined in accordance with the above-mentioned copper(I) thiocyanate method. As a result, it was found that the amount of the N,N,N'-trimethyl-1,2-ethanediamine/copper(I) chloride complex in the composite was 0.83 mmol per gram of the composite.

Using 6.0 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 4.12 mmol in 1 minute, 4.33 mmol in 3 minutes, 4.40 mmol in 5 minutes, and 4.43 mmol in 10 minutes, cumulatively. The adsorption reached equilibrium 10 minutes after the start of contact of the composite with carbon monoxide. The results showed that the amount of carbon monoxide adsorbed in 10 minutes was 0.74 mmol per gram of the composite. (first adsorption experiment)

6.1 g of the resultant composite having adsorbed thereon carbon monoxide was placed in a 50-ml one-neck eggplant type flask, and the flask was evacuated at 30° C. to and maintained at a pressure of 0.3 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 3.70 mmol in 1 minute, 3.88 mmol in 3 minutes, and 3.92 mmol in 5 minutes, and 3.95 mmol in 10 minutes, cumulatively. The adsorption reached equilibrium 10 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

On the other hand, 6.1 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 0.55 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount of carbon monoxide (0.55 mmol) as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 13

Production of a composite was performed in substantially the same manner as in Example 2, except that use was made of 5.5 mmol of 4-methylpyridine (a first grade reagent, manufactured and sold by Tokyo Kasei Kogyo Co., Ltd., Japan) instead of pyridine, to thereby obtain a composite comprising silica gel having carried thereon a binary complex of 4-methylpyridine and copper(I) chloride. The composite had uniform yellow color.

With respect to the obtained composite, the amount of the binary complex of 4-methylpyridine and copper(I) chloride carried on the silica gel was determined in accordance with the above-mentioned copper(I) thiocyanate method. As a result, it was found that the amount of the 4-methylpyridine/copper(I) chloride complex in the composite was 0.84 mmol per gram of the composite.

Using 5.9 g of the above-obtained composite, an adsorption experiment for carbon monoxide was conducted and the amount of carbon monoxide adsorbed on the above-obtained composite was determined in substantially the same manner as in Example 1. The composite showed rapid adsorption of carbon monoxide. That is, the amount of carbon monoxide adsorbed on the composite was 2.39 mmol in 1 minute, 2.99 mmol in 3 minutes, 3.21 mmol in 5 minutes, and 3.38 mmol in 10 minutes, cumulatively. The adsorption reached equilibrium 10 minutes after the start of contact of the composite with carbon monoxide. The results showed that the amount of carbon monoxide adsorbed in 10 minutes was 0.57 mmol per gram of the composite. (first adsorption experiment)

6.0 g of the resultant composite having adsorbed thereon carbon monoxide was placed in a 50-ml one-neck eggplant type flask, and the flask was evacuated at 30° C. to and maintained at a pressure of 2.0 mmHg for 5 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 2.43 mmol in 1 minute, 2.87 mmol in 3 minutes, and 3.03 mmol in 5 minutes, and mmol in 10 minutes, cumulatively. The adsorption reached equilibrium 10 minutes after the start of contact of the composite with carbon monoxide.

Substantially the same adsorption an desorption experiments as mentioned above were repeated. Despite the repeated use of the composite, the composite showed almost no change in the rate and amount of adsorption of carbon monoxide on the composite.

On the other hand, 6.0 g of the same composite (having adsorbed thereon carbon monoxide) as obtained in the first adsorption experiment was heated to 70° C. under a pressure of 1 atm. Rapid desorption of the carbon monoxide occurred. That is, the amount of carbon monoxide desorbed from the composite was 2.23 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount of carbon monoxide (2.23 mmol) as desorbed from the composite was adsorbed on the composite. Substantially the same adsorption and desorption experiments as mentioned above were repeated. Despite the repeated use of the composite, the composite showed almost no change in the rate and amount of adsorption of carbon monoxide on the composite.

EXAMPLE 14

Production of a composite was performed in substantially the same manner as in Example 3, except that use was made of 4.1 mmol of N,N,N'-trimethyl-1,3-propanediamine (a reagent manufactured and sold by Aldrich Chemical Company, Inc., U.S.A.) instead of N,N,N',N'-tetramethyl-1,2-ethanediamine, to thereby obtain a black composite comprising the activated carbon having carried thereon the binary complex of N,N,N'-trimethyl-1,3-propanediamine and copper(I) chloride.

Using 3.3 g of the above-obtained composite, an adsorption experiment for carbon monoxide was conducted and the amount of carbon monoxide adsorbed on the composite was determined is substantially the same manner as in Example 1. The composite showed rapid adsorption of carbon monoxide. That is, the amount of carbon monoxide adsorbed on the composite was 2.59 mmol in 1 minute, 2.85 mmol in 3 minutes, 2.91 mmol in 5 minutes, and 2.98 mmol in 10 minutes, cumulatively. The adsorption reached equilibrium 10 minutes after the start of contact of the composite with carbon monoxide.

EXAMPLE 15

Production of a composite was performed in substantially the same manner as in Example 4, except that use was made of 5.5 mmol of N,N-dimethyl-1,2-ethanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising the silica gel having carried thereon the binary complex of N,N-dimethyl-1,2-ethanediamine and copper(I) chloride. The composite had uniform violet color.

With respect to the obtained composite, the amount of the binary complex of N,N-dimethyl-1,2-ethanediamine and copper(I) chloride carried on the silica gel was determined in accordance with the above-mentioned copper(I) thiocyanate method. As a result, it was found that the amount of the N,N-dimethyl-1,2-ethanediamine/copper(I) chloride complex in the composite was 0.68 mmol per gram of the composite.

Using 5.8 g of the above-obtained composite, an adsorption experiment for carbon monoxide was conducted and the amount of carbon monoxide adsorbed on the composite was determined in substantially the same manner as in Example 1. The obtained composite showed rapid adsorption of carbon monoxide. That is, the amount of carbon monoxide adsorbed on the composite was 1.23 mmol in 1 minute, and 1.25 mmol in 3 minutes, cumulatively. The adsorption reached equilibrium 3 minutes after the start of contact of the composite with carbon monoxide. The results showed that the amount of carbon monoxide adsorbed in 3 minutes was 0.22 mmol per gram of the composite.

EXAMPLE 16

Production of a composite was performed in substantially the same manner as in Example 3, except that use was made of 4.1 mmol of N,N-dimethyl-1,3-propanediamine (a first grade reagent, manufactured and sold by Tokyo Kasei Kogyo Co., Ltd., Japan) instead of N,N,N',N'-tetramethyl-1,2-ethanediamine, to thereby obtain a black composite comprising the activated carbon having carried thereon the binary complex of N,N-dimethyl-1,3-propanediamine and copper(I) chloride.

Using 3.2 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 2.27 mmol in 1 minute, 2.43 mmol in 3 minutes, 2.46 mmol in 5 minutes, and 2.50 mmol in 10 minutes, cumulatively. The adsorption reached equilibrium 10 minutes after the start of contact of the composite with carbon monoxide.

EXAMPLE 17

Production of a composite was performed in substantially the same manner as in Example 4, except that use was made of 5.5 mmol of N,N,N'-triethyl-1,2-ethanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising silica gel having carried thereon a binary complex of N,N,N'-triethyl-1,2-ethanediamine and copper(I) chloride. The composite had a uniform brown color.

With respect to the obtained composite, the amount of the binary complex of N,N,N'-triethyl-1,2-ethanediamine and copper(I) chloride carried on the silica gel was determined in accordance with the above-mentioned copper(I) thiocyanate method. As a result, it was found that the amount of the N,N,N'-triethyl-1,2-ethanediamine/copper(I) chloride complex in the composite was 0.80 mmol per gram of the composite.

Using 6.2 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 4.04 mmol in 1 minute, 4.27 mmol in 3 minutes, 4.33 mmol in 5 minutes, and 4.37 mmol in 10 minutes, cumulatively. The adsorption reached equilibrium 10 minutes after the start of contact of the composite with carbon monoxide. The results showed that the amount of carbon monoxide adsorbed in 10 minutes was 0.70 mmol per gram of the composite.

EXAMPLE 18

Production of a composite was performed in substantially the same manner as in Example 3, except that use was made of 4.1 mmol of N,N'-dimethyl-1,3-propanediamine (a reagent manufactured and sold by Aldrich Chemical Company, Inc., U.S.A.) instead of N,N,N',N'-tetramethyl-1,2-ethanediamine, to thereby obtain a black composite comprising activated carbon having carried thereon a binary complex of N,N'-dimethyl-1,3-propanediamine and copper(I) chloride.

Using 3.2 g of the above-obtained composite, an adsorption experiment for carbon monoxide was conducted and the amount of carbon monoxide adsorbed on the composite was determined in substantially the same manner as in Example 1. The amount of carbon monoxide adsorbed on the composite was 2.67 mmol in 1 minute, 2.96 mmol in 3 minutes, 3.05 mmol in 5 minutes, and 3.14 mmol in 10 minutes, cumulatively. The adsorption reached equilibrium 10 minutes after the start of contact of the composite with carbon monoxide.

EXAMPLE 19

Production of a composite was performed in substantially the same manner as in Example 4, except that use was made of 5.5 mmol of N,N,N',N'-tetramethyl-1,3-propanediamine (a special grade reagent, manufactured and sold by Tokyo Kasei Kogyo Co., Ltd., Japan) instead of N,N,N',N'-tetramethyl-1,2-ethanediamine, to thereby obtain a composite comprising silica gel having carried thereon a binary complex of N,N,N',N'-tetramethyl-1,3-propanediamine and copper(I) chloride. The composite had a uniform pale green color.

With respect to the obtained composite, the amount of the binary complex of N,N,N',N'-tetramethyl-1,3-propanediamine and copper(I) chloride carried on the silica gel was determined in accordance with the above-mentioned copper(I) thiocyanate method. As a result, it was found that the amount of the N,N,N',N'-tetramethyl-1,3-propanediamine/copper(I) chloride complex in the composite was 0.82 mmol per gram of the composite.

Using 6.1 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 3.05 mmol in 1 minute, 3.38 mmol in 3 minutes, 3.52 mmol in 5 minutes, and 3.61 mmol in 10 minutes, cumulatively. The adsorption reached equilibrium 10 minutes after the start of contact of the composite with carbon monoxide. The results showed that the amount of carbon monoxide adsorbed in 10 minutes was 0.59 mmol per gram of the composite. (first adsorption experiment)

6.2 g of the resultant composite having adsorbed thereon carbon monoxide was placed in a 50-ml one-neck eggplant type flask, and the flask was evacuated at 30° C. to and maintained at a pressure of 0.1 mmHg for 30 minutes. Rapid desorption of the carbon monoxide from the composite occurred. The carbon monoxide-desorbed composite was contacted with pure carbon monoxide in substantially the same manner as mentioned above, so as to adsorb again carbon monoxide thereon. As a result, it was found that the amount of carbon monoxide adsorbed on the composite was 2.99 mmol in 1 minute, 3.28 mmol in 3 minutes, 3.39 mmol in 5 minutes, and 3.43 mmol in 10 minutes, cumulatively. The adsorption reached equilibrium 10 minutes after the start of contact of the composite with carbon monoxide.

Substantially the same adsorption and desorption experiments as mentioned above were repeated. Despite the repeated use of the composite, the composite showed almost no change in the rate and amount of adsorption of carbon monoxide on the composite.

On the other hand, 6.2 g of the same composite (having adsorbed thereon carbon monoxide) as obtained in the first adsorption experiment was heated to 70° C. under a pressure of 1 atm. Rapid desorption of the carbon monoxide from the composite occurred. That is, the amount of carbon monoxide desorbed from the composite was 1.45 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount of carbon monoxide (1.45 mmol) as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 20

Production of a composite was performed in substantially the same manner as in Example 3, except that use was made of 4.1 mmol of N-methyl-1,3-propanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising activated carbon having carried thereon a binary complex of N-methyl-1,3-propanediamine and copper(I) chloride. The composite had uniform bluish violet color.

Using 3.2 g of the above-obtained composite, an adsorption experiment for carbon monoxide was conducted and the amount of carbon monoxide adsorbed on the composite was determined in substantially the same manner as in Example 1. The amount of carbon monoxide adsorbed on the composite was 1.96 mmol in 1 minute, 2.08 mmol in 3 minutes, 2.10 mmol in 5 minutes, and 2.11 mmol in 10 minutes, cumulatively. The adsorption reached equilibrium 10 minutes after the start of contact of the composite with carbon monoxide.

EXAMPLE 21

Production of a composite was performed in substantially the same manner as in Example 4, except that use was made of N,N,N'-trimethyl-1,3-propanediamine (manufactured and sold by Aldrich Chemical Company, Inc., U.S.A.) instead of N,N,N',N'-tetramethyl-1,2-ethanediamine, to thereby obtain a composite comprising silica gel having carried thereon a binary complex of N,N,N'-trimethyl-1,3-propanediamine and copper(I) chloride. The composite had uniform pale green color.

With respect to the obtained composite, the amount of the binary complex of N,N,N'-trimethyl-1,3-propanediamine and copper(I) chloride carried on the silica gel was determined in accordance with the above-mentioned copper(I) thiocyanate method. As a result, it was found that the amount of the N,N,N'-trimethyl-1,3-propanediamine/copper(I) chloride complex in the composite was 0.82 mmol per gram of the composite.

Using 6.1 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 3.90 mmol in 1 minute, 4.18 mmol in 3 minutes, 4.27 mmol in 5 minutes, and 4.33 mmol in 10 minutes, cumulatively. The adsorption reached equilibrium 10 minutes after the start of contact of the composite with carbon monoxide. The results showed that the amount of carbon monoxide adsorbed in 10 minutes was 0.71 mmol per gram of the composite. (first adsorption experiment)

6.2 g of the resultant composite having adsorbed thereon carbon monoxide was heated to 70° C. under a pressure of 1 atm. Rapid desorption of the carbon monoxide from the composite occurred. That is, the amount of carbon monoxide desorbed from the composite in 10 minutes was 1.02 mmol. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon

EXAMPLE 22

Production of a composite was performed in substantially the same manner as in Example 4, except that use was made of 5.5 mmol of N,N-dimethyl-1,3-propanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising silica gel having carried thereon a binary complex of N,N-dimethyl-1,3-propanediamine and copper(I) chloride. The composite had uniform pale blue color.

With respect to the obtained composite, the amount of the binary complex of N,N-dimethyl-1,3-propanediamine and copper(I) chloride carried on the silica gel was determined in accordance with the above-mentioned copper(I) thiocyanate method. As a result, it was found that the amount of the N,N-dimethyl-1,3-propanediamine/copper(I) chloride complex in the composite was 0.82 mmol per gram of the composite.

Using 6.0 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 3.56 mmol in 1 minute, 3.98 mmol in 3 minutes, 4.12 mmol in 5 minutes, and 4.22 mmol in 10 minutes, cumulatively. The adsorption reached equilibrium 10 minutes after the start of contact of the composite with carbon monoxide. The results showed that the amount of carbon monoxide adsorbed in 10 minutes was 0.70 mmol per gram of the composite. (first adsorption experiment)

6.1 g of the resultant composite having adsorbed thereon carbon monoxide was heated to 70° C. under a pressure of 1 atm. Rapid desorption of carbon monoxide from the composite occurred. That is, the amount of carbon monoxide desorbed from the composite was 1.80 mmol in 10 minutes. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (1.80 mmol) of carbon monoxide as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 23

Production of a composite was performed in substantially the same manner as in Example 4, except that use was made of 5.5 mmol of N,N'-dimethyl-1,3-propanediamine (manufactured and sold by Aldrich Chemical Company, Inc., U.S.A.) instead of N,N,N',N'-tetramethyl-1,2-ethanediamine, to thereby obtain a composite comprising silica gel having carried thereon a binary complex of N,N'-dimethyl-1,3-propanediamine and copper(I) chloride. The composite had uniform pale bluish green color.

With respect to the obtained composite, the amount of the binary complex of N,N'-dimethyl-1,3-propanediamine and copper(I) chloride carried on the silica gel was determined in accordance with the above-mentioned copper(I) thiocyanate method. As a result, it was found that the amount of the N,N'-dimethyl-1,3-propanediamine/copper(I) chloride complex in the composite was 0.82 mmol per gram of the composite.

Using 6.0 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount of carbon monoxide adsorbed on the composite was 3.93 mmol in 1 minute, 4.20 mmol in 3 minutes, 4.30 mmol in 5 minutes, and 4.34 mmol in 10 minutes, cumulatively. The adsorption reached equilibrium 10 minutes after the start of contact of the composite with carbon monoxide. The results showed that the amount of carbon monoxide adsorbed in 10 minutes was 0.72 mmol per gram of the composite. (first adsorption experiment)

6.1 g of the resultant composite having adsorbed thereon carbon monoxide was heated to 70° C. under a pressure of 1 atm. Rapid desorption of carbon monoxide from the composite occurred. That is, the amount of carbon monoxide desorbed from the composite in 10 minutes was 0.89 mmol. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (0.89 mmol) of carbon monoxide as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 24

Production of a composite was performed in substantially the same manner as in Example 4, except that use was made of 5.5 mmol of N-methyl-1,3-propanediamine (a first grade reagent, manufactured and sold by Tokyo Kasei Kogyo Co., Ltd., Japan) instead of N,N,N',N'-tetramethyl-1,2-ethanediamine, to thereby obtain a composite comprising silica gel having carried thereon a binary complex of N-methyl-1,3-propanediamine and copper(I) chloride. The composite had uniform blue color.

With respect to the obtained composite, the amount of the binary complex of N-methyl-1,3-propanediamine and copper(I) chloride carried on the silica gel was determined in accordance with the above-mentioned copper(I) thiocyanate method. As a result, it was found that the amount of the

--- monoxide thereon. As a result, it was found that the same amount (1.02 mmol) of carbon monoxide as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

N-methyl-1,3-propanediamine/copper(I) chloride complex in the composite was 0.80 mmol per gram of the composite.

Using 5.9 g of the above-obtained composite, an adsorption experiment for carbon monoxide was conducted and the amount of carbon monoxide adsorbed on the composite was determined in substantially the same manner as in Example 1. The composite showed rapid adsorption of carbon monoxide. That is, the amount carbon monoxide adsorbed on the composite was 3.24 mmol in 1 minute, 3.49 mmol in 3 minutes, 3.56 mmol in 5 minutes, and 3.60 mmol in 10 minutes, cumulatively. The adsorption reached equilibrium 10 minutes after the start of contact of the composite with carbon monoxide. The results showed that the amount of carbon monoxide adsorbed in 10 minutes was 0.61 mmol per gram of the composite. (first adsorption experiment)

6.0 g of the resultant composite having adsorbed thereon carbon monoxide was heated to 70° C. under a pressure of 1 atm. Rapid desorption of carbon monoxide from the composite occurred. That is, the amount of carbon monoxide desorbed from the composite in 10 minutes was 1.10 mmol. The desorption of carbon monoxide from the composite reached equilibrium 10 minutes after the start of heating of the composite. And then, the temperature of the composite was returned to 30° C. under a pressure of 1 atm. The carbon monoxide-desorbed composite was contacted with pure carbon monoxide in substantially the same manner as in the above-mentioned first adsorption experiment except that the evacuation of the flask prior to the introduction of carbon monoxie was not conducted, so as to adsorb again carbon monoxide thereon. As a result, it was found that the same amount (1.10 mmol) of carbon monoxide as desorbed from the composite was adsorbed on the composite.

Substantially the same adsorption and desorption experiments as mentioned above were repeated. Despite the repeated use of the composite, the composite showed almost no change in the rate and amount of adsorption of carbon monoxide on the composite.

EXAMPLE 25

[In conducting an adsorptive separation of carbon monoxide by means of an adsorbent on a commercial scale, an accident occasionally occurs in which the adsorbent happens to contact the air by mistake before use for adsorbing carbon monoxide. Therefore, in this Example, the composite (adsorbent) was contacted with the air before use for adsorption of carbon monoxide.]

3.2 g of the same intact composite [comprising the activated carbon having carried thereon a binary complex of pyridine and copper(I) chloride] as obtained in Example 1 was contacted with the air at 20° C. for 10 seconds under atmospheric pressure and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds, was 1.73 mmol in 1 minute, 1.96 mmol in 3 minutes, 2.02 mmol in 5 minutes, and 2.05 mmol in 10 minutes, cumulatively. The adsorption reached equilibrium 10 minutes after the start of contact of the composite with carbon monoxide.

From comparison of the above adsorption data with the adsorption data in Example 1, it was found that the amount of carbon monoxide adsorbed on the composite, which had been contacted in advance with the air for 10 seconds, was 75.6 mol. %, relative to the molar amount of carbon monoxide adsorbed on the composite which had not been contacted with the air. This shows that, when the composite was contacted in advance with the air, the amount of carbon monoxide which could be adsorbed on the composite decreased.

On the other hand, the above composite which had been contacted with the air for 10 seconds was heat-treated at 120° C. in a carbon monoxide atmosphere of 1 atm. for 48 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds and then heat-treated in a carbon monoxide atmosphere, was 2.23 mmol in 1 minute, 2.53 mmol in 3 minutes, 2.58 mmol in 5 minutes, and 2.60 mmol in 10 minutes, cumulatively. The adsorption reached equilibrium 10 minutes after the start of contact of the composite with carbon monoxide.

From comparison of the above adsorption data with the adsorption data in Example 1, it was found that the amount of carbon monoxide adsorbed on the composite, which had been contacted in advance with the air for 10 seconds and then heat-treated in a carbon monoxide atmosphere, was 95.9 mol. %, relative to the molar amount of carbon monoxide adsorbed on the composite which had not been contacted with the air. This shows that, even when the ability of the composite (adsorbent) to adsorb carbon monoxide was once lowered by contact with the air, the ability of the adsorbent to adsorb carbon monoxide could be recovered by treating the adsorbent with carbon monoxide to substantially the same level as achieved by the adsorbent which had not been contacted with the air.

EXAMPLE 26

[As in Example 25, the accident was simulated in which the adsorbent happens to contact the air by mistake before use for adsorbing carbon monoxide. That is, in this Example, the composite (adsorbent) was contacted with the air before use for adsorption of carbon monoxide.]

5.7 g of the same intact composite [comprising the silica gel having carried thereon a binary complex of pyridine and copper(I) chloride] as obtained in Example 2 was contacted with the air at 20° C. for 10 seconds under atmospheric pressure and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds, was 2.28 mmol in 1 minute, 2.55 mmol in 3 minutes, 2.65 mmol in 5 minutes, and 2.71 mmol in 10 minutes, cumulatively. The adsorption reached equilibrium 10 minutes after the start of contact of the composite with carbon monoxide.

From comparison of the above adsorption data with the adsorption data in Example 2, it was found that the amount of carbon monoxide adsorbed on the composite, which had been contacted in advance with the air for 10 seconds, was 82.4 mol. %, relative to the molar amount of carbon monoxide adsorbed on the composite which had not been contacted with the air. This shows that, when the composite was contacted in advance with the air, the amount of carbon monoxide which could be adsorbed on the composite decreased.

On the other hand, the above composite which had been contacted with the air for 10 seconds was heat-treated at 120° C. in a carbon monoxide atmosphere of 1 atm. for 48 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds and then heat-treated in a carbon monoxide atmosphere, was 2.47 mmol in 1 minute, 2.84 mmol in 3 minutes, 2.99 mmol in 5 minutes, and 3.09 mmol in 10 minutes, cumulatively. The adsorption reached equilibrium 10 minutes after the start of contact of the composite with carbon monoxide.

From comparison of the above adsorption data with the adsorption data in Example 2, it was found that the amount of carbon monoxide adsorbed on the composite, which had been contacted in advance with the air for 10 seconds and then heat-treated in a carbon monoxide atmosphere, was 93.9 mol. %, relative to the molar amount of carbon monoxide adsorbed on the composite which had not been contacted with the air. This shows that, even when the ability of the composite (adsorbent) to adsorb carbon monoxide was once lowered by contact with the air, the ability of the adsorbent to adsorb carbon monoxide could be recovered by treating the composite with carbon monoxide to substantially the same level as achieved by the adsorbent which had not been contacted with the air.

EXAMPLE 27

[As in Example 25, the accident was simulated in which the adsorbent happens to contact the air by mistake before use for adsorbing carbon monoxide. That is, in this Example, the composite (adsorbent) was contacted with the air before use for adsorption of carbon monoxide.]

3.3 g of the same intact composite [comprising the activated carbon having carried thereon a binary complex of N,N,N',N'-tetramethyl-1,2-ethanediamine and copper(I) chloride] as obtained in Example 3 was contacted with the air at 20° C. for 10 seconds under atmospheric pressure and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds, was 2.39 mmol in 1 minute, 2.62 mmol in 3 minutes, 2.67 mmol in 5 minutes, and 2.69 mmol in 10 minutes, cumulatively. The adsorption reached equilibrium 10 minutes after the start of contact of the composite with carbon monoxide.

From comparison of the above adsorption data with the adsorption data in Example 3, it was found that the amount of carbon monoxide adsorbed on the composite, which had been contacted in advance with the air for 10 seconds, was 86.5 mol. %, relative to the molar amount of carbon monoxide adsorbed on the composite which had not been contacted with the air. This shows that, when the composite was contacted in advance with the air, the amount of carbon monoxide which could be adsorbed on the composite decreased.

On the other hand, the above composite which had been contacted with the air for 10 seconds was heat-treated at 120° C. in a carbon monoxide atmosphere of 1 atm. for 3 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds and then heat-treated in a carbon monoxide atmosphere, was 2.95 mmol in 1 minute and 3.11 mmol in 3 minutes, cumulatively. The adsorption reached equilibrium 3 minutes after the start of contact of the composite with carbon monoxide.

From comparison of the above adsorption data with the adsorption data in Example 3, it was found that the amount of carbon monoxide adsorbed on the composite, which had been contacted in advance with the air for 10 seconds and then heat-treated in a carbon monoxide atmosphere, was the same as the amount of carbon monoxide adsorbed on the composite which had not been contacted with the air. This shows that, even when the ability of the composite (adsorbent) to adsorb carbon monoxide was once lowered by contact with the air, the ability of the adsorbent to adsorb carbon monoxide could be recovered by treating the adsorbent with carbon monoxide to the same level as achieved by the adsorbent which had not been contacted with the air.

EXAMPLE 28

[As in Example 25, the accident was simulated in which the adsorbent happens to contact the air by mistake before use for adsorbing carbon monoxide. That is, in this Example, the composite (adsorbent) was contacted with the air before use for adsorption of carbon monoxide.]

6.0 g of the same intact composite [comprising the silica gel having carried thereon a binary complex of N,N,N',N'-tetramethyl-1,2-ethanediamine and copper(I) chloride] as obtained in Example 4 was contacted with the air at 20° C. for 10 seconds under atmospheric pressure and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds, was 2.95 mmol in 1 minute, 3.10 mmol in 3 minutes, 3.15 mmol in 5 minutes, and 3.18 mmol in 10 minutes, cumulatively. The adsorption reached equilibrium 10 minutes after the start of contact of the composite with carbon monoxide.

From comparison of the above adsorption data with the adsorption data in Example 4, it was found that the amount of carbon monoxide adsorbed on the composite, which had been contacted in advance with the air for 10 seconds, was 74.5 mol. %, relative to the molar amount of carbon monoxide adsorbed on the composite which had not been contacted with the air. This shows that, when the composite was contacted in advance with the air, the amount of carbon monoxide which could be adsorbed on the composite decreased.

On the other hand, the above composite which had been contacted with the air for 10 seconds was heat-treated at 120° C. in a carbon monoxide atmosphere of 1 atm. for 3 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with the air for 10 seconds and then heat-treated in a carbon monoxide atmosphere, was 3.88 mmol in 1 minute, 4.10 mmol in 3 minutes, 4.17 mmol in 5 minutes, and 4.22 mmol in 10 minutes, cumulatively. The adsorption reached equilibrium 10 minutes after the start of contact of the composite with carbon monoxide.

From comparison of the above adsorption data with the adsorption data in Example 4, it was found that the amount of carbon monoxide adsorbed on the composite, which had been contacted in advance with the air for 10 seconds and then heat-treated in a carbon monoxide atmosphere, was 98.8 mol. %, relative to the molar amount of carbon monoxide adsorbed on the composite which had not been contacted with the air. This shows that, even when the ability of the composite (adsorbent) to adsorb carbon monoxide was once lowered by contact with the air, the ability of the adsorbent to adsorb carbon monoxide could be recovered by treating the adsorbent with carbon monoxide to substantially the same level as achieved by the adsorbent which had not been contacted with the air.

EXAMPLE 29

3.2 g of the same intact composite [comprising the activated carbon having carried thereon a binary complex of pyridine and copper(I) chloride] as obtained in Example 1 was contacted at 20° C. with oxygen (under 1 atm.) [from a pure oxygen bomb manufactured and sold by Nihon Sanso K.K., Japan (purity: not less than 99.9%)] for 30 minutes and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes, was 0.56 mmol in 1 minute, 0.78 mmol in 3 minutes, 0.85 mmol in 5 minutes, and 0.93 mmol in 10 minutes, cumulatively. The adsorption reached equilibrium 10 minutes after the start of contact of the composite with carbon monoxide.

From comparison of the above adsorption data with the adsorption data in Example 1, it was found that the amount of carbon monoxide adsorbed on the composite, which had been contacted in advance with oxygen for 30 minutes, was 34.3 mol. %, relative to the molar amount of carbon monoxide adsorbed on the composite which had not been contacted with oxygen. This shows that, when the composite was contacted in advance with oxygen, the amount of carbon monoxide which could be adsorbed on the composite decreased.

On the other hand, the above composite which had been contacted with oxygen for 30 minutes was heat-treated at 120° C. in a carbon monoxide atmosphere of 1 atm. for 48 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a carbon monoxide atmosphere, was 2.16 mmol in 1 minute, 2.44 mmol in 3 minutes, 2.48 mmol in 5 minutes, and 2.50 mmol in 10 minutes, cumulatively. The adsorption reached equilibrium 10 minutes after the start of contact of the composite with carbon monoxide.

From comparison of the above adsorption data with the adsorption data in Example 1, it was found that the amount of carbon monoxide adsorbed on the composite, which had been contacted in advance with oxygen for 30 minutes and then heat-treated in a carbon monoxide atmosphere, was 92.3 mol. %, relative to the molar amount of carbon monoxide adsorbed on the composite which had not been contacted with oxygen. It was also found that the treatment of the composite, which had been deteriorated by contact with oxygen, with carbon monoxide under heating was effective for regenerating the deteriorated composite and enhancing the carbon monoxide adsorptive ability of the composite by 58.0 mole %, in terms of the mole % relative to the molar amount of carbon monoxide adsorbed on the composite which had not been contacted with oxygen. This shows that, even when the ability of the composite (adsorbent) to adsorb carbon monoxide was once lowered by contact with oxygen, the carbon monoxide adsorptive ability of the adsorbent could be recovered by treating the adsorbent with carbon monoxide.

EXAMPLE 30

5.7 g of the same intact composite [comprising the silica gel having carried thereon a binary complex of pyridine and copper(I) chloride] as obtained in Example 2 was contacted at 20° C. with oxygen (under 1 atm.) [from a pure oxygen bomb manufactured and sold by Nihon Sanso K.K., Japan (purity: not less than 99.9%)] for 30 minutes and, thereafter, was kept in an atmosphere of nitrogen.

With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes, was 0.24 mmol in 1 minute. The adsorption reached equilibrium 1 minute after the start of contact of the composite with carbon monoxide.

From comparison of the above adsorption data with the adsorption data in Example 2, it was found that the amount of carbon monoxide adsorbed on the composite, which had been contacted in advance with oxygen for 30 minutes, was 7.3 mol. %, relative to the molar amount of carbon monoxide adsorbed on the composite which had not been contacted with oxygen. This shows that, when the composite was contacted in advance with oxygen, the amount of carbon monoxide which could be adsorbed on the composite decreased.

On the other hand, the above composite which had been contacted with oxygen for 30 minutes was heat-treated at 120° C. in a carbon monoxide atmosphere of 1 atm. for 48 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a carbon monoxide atmosphere, was 2.20 mmol in 1 minute, 2.45 mmol in 3 minutes, 2.54 mmol in 5 minutes, and 2.59 mmol in 10 minutes, cumulatively. The adsorption reached equilibrium 10 minutes after the start of contact of the composite with carbon monoxide.

From comparison of the above adsorption data with the adsorption data in Example 2, it was found that the amount of carbon monoxide adsorbed on the composite, which had been contacted in advance with oxygen for 30 minutes and then heat-treated in a carbon monoxide atmosphere, was 78.7 mol. %, relative to the molar amount of carbon monoxide adsorbed on the composite which had not been contacted with oxygen. It was also found that the treatment of the composite, which had been deteriorated by contact with oxygen, with carbon monoxide under heating was effective for regenerating the deteriorated composite and enhancing the carbon monoxide adsorptive ability of the composite by 71.4 mole %, in terms of the mole % relative to the molar amount of carbon monoxide adsorbed on the composite which had not been contacted with oxygen. This shows that, even when the ability of the composite (adsorbent) to adsorb carbon monoxide was once lowered by contact with oxygen, the carbon monoxide adsorptive ability of the adsorbent could be recovered by treating the adsorbent with carbon monoxide.

EXAMPLE 31

3.3 g of the same intact composite [comprising the activated carbon having carried thereon a binary complex of N,N,N',N'-tetramethyl-1,2-ethanediamine and copper(I) chloride] obtained in Example 3 was contacted at 20° C. with oxygen (under 1 atm.) [from a pure oxygen bomb manufactured and sold by Nihon Sanso K.K., Japan (purity: not less than 99.9%)] for 30 minutes and, thereafter, was kept in an atmosphere of nitrogen.

Using the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes, was 0.17 mmol in 1 minute, 0.18 mmol in 3 minutes, and 0.19 mmol in 5 minutes, cumulatively. The adsorption reached equilibrium 5 minutes after the start of contact of the composite with carbon monoxide.

From comparison of the adsorption data obtained above in this Example and the adsorption data in Example 3, it was found that the amount of carbon monoxide adsorbed on the composite, which had been contacted in advance with oxygen for 30 minutes, was 6.1 mol. %, relative to the molar amount of carbon monoxide adsorbed on the composite which had not been contacted with oxygen. This shows that, when the composite was contacted in advance with oxygen, the amount of carbon monoxide which could be adsorbed on the composite decreased.

On the other hand, the above composite which had been contacted with oxygen for 30 minutes was heat-treated at 120° C. in a carbon monoxide atmosphere of 1 atm. for 3 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a carbon monoxide atmosphere, was 1.42 mmol in 1 minute, 1.56 mmol in 3 minutes, 1.58 mmol in 5 minutes, and 1.59 mmol in 10 minutes, cumulatively. The adsorption reached equilibrium 10 minutes after the start of contact of the composite with carbon monoxide.

From comparison of the adsorption data obtained above in this Example and the adsorption data in Example 3, it was found that the amount of carbon monoxide adsorbed on the composite, which had been contacted in advance with oxygen for 30 minutes and then heat-treated in a carbon monoxide atmosphere, was 51.1 mol. %, relative to the molar amount of carbon monoxide adsorbed on the composite which had not been contacted with oxygen. It was also found that the treatment of the composite, which had been deteriorated by contact with oxygen, with carbon monoxide under heating was effective for regenerating the deteriorated composite and enhancing the carbon monoxide adsorptive ability of the composite by 45.0 mole %, in terms of the mole % relative to the molar amount of carbon monoxide adsorbed on the composite which had not been contacted with oxygen. This shows that, even when the ability of the composite (adsorbent) to adsorb carbon monoxide was once lowered by contact with oxygen, the carbon monoxide adsorptive ability of the adsorbent could be recovered by treating the adsorbent with carbon monoxide.

EXAMPLE 32

6.0 g of the same intact composite [comprising the silica gel having carried thereon a binary complex of N,N,N',N'-tetramethyl-1,2-ethanediamine and copper(I) chloride] as obtained in Example 4 was contacted at 20° C. with oxygen (under 1 atm.) [from a pure oxygen bomb manufactured and sold by Nihon Sanso K.K., Japan (purity: not less than 99.9%)] for 30 minutes and, thereafter, was kept in an atmosphere of nitrogen.

Using the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes, was 0.15 mmol in 1 minute, 0.17 mmol in 3 minutes, 0.19 mmol in 5 minutes, and 0.20 mmol in 10 minutes, cumulatively. The adsorption reached equilibrium 10 minutes after the start of contact of the composite with carbon monoxide.

From comparison of the adsorption data obtained above in this Example and the adsorption data in Example 4, it was found that the amount of carbon monoxide adsorbed on the composite, which had been contacted in advance with oxygen for 30 minutes, was 4.7 mol. %, relative to the molar amount of carbon monoxide adsorbed on the composite which had not been contacted with oxygen. This shows that, when the composite was contacted in advance with oxygen, the amount of carbon monoxide which could be adsorbed on the composite decreased.

On the other hand, the above composite which had been contacted with oxygen for 30 minutes was heat-treated at 120° C. in a carbon monoxide atmosphere of 1 atm. for 3 hours, and then subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a carbon monoxide atmosphere, was 3.90 mmol in 1 minute, 4.14 mmol in 3 minutes, 4.19 mmol in 5 minutes, and 4.25 mmol in 10 minutes, cumulatively. The adsorption reached equilibrium 10 minutes after the start of contact of the composite with carbon monoxide.

From comparison of the adsorption data above obtained in this Example and the adsorption data in Example 4, it was found that the amount of carbon monoxide adsorbed on the composite, which had been contacted in advance with oxygen for 30 minutes and then heat-treated in a carbon monoxide atmosphere, was 99.5 mol. %, relative to the molar amount of carbon monoxide adsorbed on the composite which had not been contacted with oxygen. This shows that, even when the ability of the composite (adsorbent) to adsorb carbon monoxide was once lowered by contact with oxygen, the adsorptive ability of the adsorbent for carbon monoxide could be recovered by treating the adsorbent with carbon monoxide to substantially the same level as achieved by the adsorbent which had not been contacted with oxygen.

EXAMPLE 33

3.2 g of the same intact composite [comprising the activated carbon having carried thereon a binary complex of pyridine and copper(I) chloride] as obtained in Example 1 was contacted at 20° C. with oxygen (under 1 atm.) for 30 minutes and, thereafter, was kept in an atmosphere of nitrogen. The resultant composite was heat-treated at 120° C. in an atmosphere of hydrogen [manufactured and sold by Nihon Sanso K.K., Japan (purity: not less than 99.99999%)] (under 1 atm.) for 48 hours, and subsequently, was subjected to a vacuum treatment at 70° C. under a pressure of 0.1 mmHg for 3 hours. With respect to the resultant composite, an adsorption experiment for carbon monoxide was conducted and the amount of carbon monoxide adsorbed on the composite was determined in substantially the same manner as in Example 1. The amount of carbon monoxide adsorbed on the above composite, which has been contacted in advance with oxygen for 30 minutes and then heat-treated in a hydrogen atmosphere, was 2.24 mmol in 1 minute, 2.53 mmol in 3 minutes, 2.58 in 5 minutes, and 2.59 mmol in 10 minutes, cumulatively. The adsorption reached equilibrium 10 minutes after the start of contact of the composite with carbon monoxide.

From comparison of the above adsorption data with the adsorption data in Example 1, it was found that the amount of carbon monoxide adsorbed on the composite, which had been contacted in advance with oxygen for 30 minutes and then heat-treated in a hydrogen atmosphere, was 95.6 mol. %, relative to the molar amount of carbon monoxide adsorbed on the composite which had not been contacted with oxygen. This shows that, even when the ability of the composite to adsorb carbon monoxide was once lowered markedly by contact with oxygen, the adsorptive ability of the composite for carbon monoxide could be recovered by treating the composite with hydrogen to substantially the same level as achieved by the composite which had not been contacted with oxygen.

As can be seen from Examples 25, 29 and 33, even when the adsorptive ability of the [pyridine compound/Cu(I) halide]-activated carbon composite for carbon monoxide is once lowered by unintended contact of the composite with an oxygen-containing gas, such as the air or the like, the adsorptive ability of the composite for carbon monoxide can be recovered by treating the deteriorated composite with a reducing gas.

EXAMPLE 34

5.7 g of the same intact composite [comprising the silica gel having carried thereon a binary complex of pyridine and copper(I) chloride] as obtained in Example 2 was contacted at 20° C. with oxygen (under 1 atm.) for 30 minutes and, thereafter, was kept in an atmosphere of nitrogen. The resultant composite was heat-treated at 120° C. in an atmosphere of hydrogen [manufactured and sold by Nihon Sanso K.K., Japan (purity: not less than 99.99999%)] (under 1 atm.) for 48 hours, and subsequently, was subjected to a vacuum treatment at 70° C. under a pressure of 0.1 mmHg for 3 hours. With respect to the resultant composite, which had been contacted in advance with oxygen for 30 minutes and then heat-treated in a hydrogen atmosphere, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a hydrogen atmosphere, was 2.57 mmol in 1 minute, 3.01 mmol in 3 minutes, 3.14 mmol in 5 minutes, and 3.23 mmol in 10 minutes, cumulatively. The adsorption reached equilibrium 10 minutes after the start of contact of the composite with carbon monoxide.

From comparison of the above adsorption data with the adsorption data in Example 2, it was found that the amount of carbon monoxide adsorbed on the composite, which had been contacted in advance with oxygen for 30 minutes and then heat-treated in a hydrogen atmosphere, was 98.2 mol. %, relative to the molar amount of carbon monoxide adsorbed on the composite which had not been contacted with oxygen. This shows that, even when the ability of the composite (adsorbent) to adsorb carbon monoxide is once markedly lowered by contact with oxygen, the carbon monoxide adsorptive ability of the adsorbent can be recovered by treating the adsorbent with hydrogen to substantially the same level as achieved by the adsorbent which had not been contacted with oxygen.

EXAMPLE 35

3.3 g of the same intact composite [comprising the activated carbon having carried thereon a binary complex of N,N,N',N'-tetramethyl-1,2-ethanediamine and copper(I) chloride] as obtained in Example 3 was contacted with oxygen (under 1 atm.) for 30 minutes and, thereafter, was kept in an atmosphere of nitrogen. The resultant composite was heat-treated at 120° C. in an atmosphere of hydrogen [manufactured and sold by Nihon Sanso K.K., Japan (purity: not less than 99.99999%)] (under of 1 atm.) for 3 hours, and subsequently, was subjected to a vacuum treatment at 70° C. under a pressure of 0.1 mmHg for 3 hours. With respect to the resultant composite, which had been contacted in advance with oxygen for 30 minutes and then heat-treated in a hydrogen atmosphere, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a hydrogen atmosphere, was 1.17 mmol in 1 minute, 1.30 mmol in 3 minutes, 1.32 mmol in 5 minutes, and 1.33 mmol in 10 minutes, cumulatively. The adsorption reached equilibrium 10 minutes after the start of contact of the composite with carbon monoxide.

From comparison of the above adsorption data with the adsorption data in Example 3, it was found that the amount of carbon monoxide adsorbed on the composite, which had been contacted in advance with oxygen for 30 minutes and then heat-treated in a hydrogen atmosphere, was 42.8 mol. %, relative to the molar amount of carbon monoxide adsorbed on the composite which had not been contacted with oxygen. It Was also found that the heat-treatment of the composite, which had been deteriorated by contact with oxygen, with hydrogen was effective for regenerating the deteriorated composite and enhancing the carbon monoxide adsorptive ability of the composite by 36.7 mol. %, in terms of the mole % relative to the molar amount of carbon monoxide adsorbed on the composite which had not been contacted with oxygen.

As can be seen from Examples 27, 31 and 35, even when the adsorptive ability of the [diamine/Cu(I) halide]-activated carbon composite adsorbent [wherein the diamine is represented by formula (1)] for carbon monoxide is once lowered by unintended contact of the adsorbent with an oxygen-containing gas, such as the air or the like, to deteriorate the adsorbent, the adsorptive ability of the deteriorated adsorbent can be increased by treating the deteriorated adsorbent with a reducing gas.

EXAMPLE 36

6.0 g of the same intact composite [comprising the silica gel having carried thereon a binary complex of N,N,N',N'-tetramethyl-1,2-ethanediamine and copper(I) chloride] as obtained in Example 4 was contacted at 20° C. with oxygen (under 1 atm.) for 30 minutes under atmospheric pressure and, thereafter, was kept in an atmosphere of nitrogen. The resultant composite was heat-treated at 120° C. in an atmosphere of hydrogen [manufactured and sold by Nihon Sanso K.K., Japan (purity: not less than 99.99999%)] (under 1 atm.) for 3 hours, and subsequently, was subjected to a vacuum treatment at 70° C. under a pressure of 0.1 mmHg for 3 hours. With respect to the resultant composite, which had been contacted in advance with oxygen for 30 minutes and then heat-treated in a hydrogen atmosphere, an adsorption experiment for carbon monoxide was conducted and the amount of carbon monoxide adsorbed on the composite was determined in substantially the same manner as in Example 1. The amount of carbon monoxide adsorbed on the above composite, which had been contacted in advance with oxygen for 30 minutes and then heat-treated in a hydrogen atmosphere, was 1.13 mmol in 1 minute, 1.19 mmol in 3 minutes, 1.21 mmol in 5 minutes, and 1.24 mmol in 10 minutes, cumulatively. The adsorption reached equilibrium 10 minutes after the start of contact of the composite with carbon monoxide.

From comparison of the above adsorption data with those in Examples 4 and 32, it was found that the amount of carbon monoxide adsorbed on the composite, which had been contacted in advance with oxygen for 30 minutes and then heat-treated in a hydrogen atmosphere, was 29.0 mol. %, relative to the molar amount of carbon monoxide adsorbed on the composite which had not been contacted with the oxygen. It was also found that the heat-treatment of the composite, which had been deteriorated by contact with oxygen, with hydrogen was effective for regenerating the deteriorated composite and enhancing the carbon monoxide adsorptive ability of the composite by 24.3 mole %, in terms of the mole % relative to the molar amount of carbon monoxide adsorbed on the composite which had not been contacted with oxygen. This shows that even when the ability of the composite (adsorbent) to adsorb carbon monoxide is once lowered by contact with oxygen, the carbon monoxide adsorptive ability of the adsorbent can be recovered by the treatment thereof with hydrogen.

EXAMPLE 37

5.7 g of the same intact composite [comprising the silica gel having carried thereon the binary complex of pyridine and copper(I) chloride] as obtained in Example 2 was contacted at 20° C. with oxygen (under 1 atm.) for 30 minutes and, thereafter, was kept in an atmosphere of nitrogen. To the resultant composite was added a solution of 2.5 mmol of hydroquinone in 10 ml of diethyl ether. The resultant mixture was shaken at 30° C. for 1 hour. The solution was removed from the mixture, and the composite left was vacuum dried at 70° C. for 3 hours under a pressure of 0.1 mmHg. The resultant composite, which had been contacted with oxygen for 30 minutes and then treated with hydroquinone, was contacted with carbon monoxide in substantially the same manner as Example 1 so as to adsorb carbon monoxide thereon. The amount of carbon monoxide adsorbed on the composite was 1.75 mmol in 1 minute, 1.93 mmol in 3 minutes, 2.02 mmol in 5 minutes, and 2.09 mmol in 10 minutes, cumulatively. The adsorption reached equilibrium 10 minutes after the start of contact of the composite with carbon monoxide.

From comparison of the adsorption data obtained above in this Example and those in Examples 2 and 30, it was found that the amount of carbon monoxide adsorbed on the composite, which had been contacted with oxygen for 30 minutes and then treated with hydroquinone, was 63.5 mol. %, relative to the molar amount of carbon monoxide adsorbed on the composite which had not been contacted with oxygen. It was also found that the treatment of the composite, which had been deteriorated by contact with oxygen, with hydroquinone was effective for regenerating the deteriorated composite and enhancing the carbon monoxide adsorptive ability of the composite by 56.2 mole %, in terms of the mole % relative to the molar amount of carbon monoxide adsorbed on the composite which had not been contacted with oxygen. This shows that even when the ability of the composite (adsorbent) to adsorb carbon monoxide is once lowered by contact with oxygen, the carbon monoxide adsorptive ability of the adsorbent can be recovered by the treatment thereof with hydroquinone.

As can be seen from Examples 26, 30, 34 and 37, even when the adsorptive ability of the [pyridine compound/Cu(I) halide]-silica gel composite adsorbent for carbon monoxide is once lowered by unintended contact of the adsorbent with an oxygen-containing gas, such as the air or the like, to deteriorate the adsorbent, the adsorptive ability of the deteriorated adsorbent can be increased by treating the deteriorated adsorbent with a reducing gas or a solution containing a reducing agent.

EXAMPLE 38

6.0 g of the same intact composite [comprising the silica gel having carried thereon the binary complex of N,N,N', N'-tetramethyl-1,2-ethanediamine and copper(I) chloride] as obtained in Example 4 was contacted at 20° C. with oxygen (under 1 atm.) for 30 minutes and, thereafter, was kept in an atmosphere of nitrogen. To the resultant composite was added a solution of 2.5 mmol of hydroquinone in 10 ml of diethyl ether. The resultant mixture was shaken at 30° C. for 1 hour. The solution was removed from the mixture, and the composite left was vacuum dried at 70° C. for 3 hours under a pressure of 0.1 mmHg. The resultant composite, which had been contacted with oxygen for 30 minutes and then treated with hydroquinone, was contacted with carbon monoxide in substantially the same manner as Example 1 so as to adsorb carbon monoxide thereon. The amount of carbon monoxide adsorbed on the composite was 2.94 mmol in 1 minute, 3.06 mmol in 3 minutes, 3.11 mmol in 5 minutes, and 3.18 mmol in 10 minutes, cumulatively. The adsorption reached equilibrium 10 minutes after the start of contact of the composite with carbon monoxide.

From comparison of the adsorption data obtained above in this Example and those in Examples 4 and 32, it was found that the amount of carbon monoxide adsorbed on the composite, which had been contacted with oxygen for 30 minutes and then treated with hydroquinone, was 74.5 mol. %, relative to the molar amount of carbon monoxide adsorbed on the composite which had not been contacted with oxygen. It was also found that the treatment of the composite, which had been deteriorated by contact with oxygen, with hydroquinone was effective for regenerating the deteriorated composite and enhancing the carbon monoxide adsorptive ability of the composite by 69.8 mole %, in terms of the mole % relative to the molar amount of carbon monoxide adsorbed on the composite which had not been contacted with oxygen. This shows that even when the ability of the composite (adsorbent) to adsorb carbon monoxide is once lowered by contact with oxygen, the carbon monoxide adsorptive ability of the adsorbent can be recovered by the treatment thereof with hydroquinone.

As can be seen from Examples 28, 32, 36 and 38, even when the adsorptive ability of the [diamine/Cu(I) halide]-silica gel composite adsorbent [wherein the diamine is represented by formula (1)] for carbon monoxide is once lowered by unintended contact of the adsorbent with an oxygen-containing gas, such as the air or the like, to deteriorate the adsorbent, the adsorptive ability of the deteriorated adsorbent can be increased by treating the deteriorated adsorbent with a reducing gas or a solution containing a reducing agent.

EXAMPLE 39

Methanol for use in this Example 39 was prepared as follows.

Methanol

Methanol (a first grade reagent, manufactured and sold by Kanto Chemical Co., Ltd., Japan) was dried over magnesium (a ribbon-shaped product, manufactured and sold by Kanto Chemical Co., Ltd., Japan), and the dried methanol was distilled under atmospheric pressure.

Production of a composite was performed in substantially the same manner as in Example 1, except that use was made of methanol instead of acetonitrile, to thereby obtain a composite comprising activated carbon having carried thereon a binary complex of pyridine and copper(I) chloride.

Specifically, in a 50-ml one-neck eggplant type flask which had been purged with nitrogen gas was placed 0.49 g (5.0 mmol) of copper(I) chloride, and 20 ml of methanol was added as a solvent, to thereby obtain a white suspension. 1.6 ml (20 mmol) of pyridine (colorless) was added to the suspension, and the resultant mixture was stirred for 1 hour by means of a magnetic stirrer, to thereby obtain a yellowish green solution.

This change of from the white suspension to the yellowish green solution indicated that a binary complex of pyridine and copper(I) chloride was formed.

2.5 g of activated carbon was placed in an eggplant type flask, and the above-obtained solution of the binary complex of pyridine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a black composite comprising the activated carbon having carried thereon the binary complex of pyridine and copper(I) chloride was obtained.

With respect to the obtained composite, the amount of the binary complex of pyridine and copper(I) chloride carried on the activated carbon was determined in accordance with the above-mentioned copper(I) thiocyanate method. As a result, it was found that the amount of the pyridine/copper(I) chloride complex in the composite was 1.17 mmol per gram of the composite.

Using 3.3 g of the composite obtained above, an adsorption experiment for carbon monoxide was conducted and the amount of carbon monoxide adsorbed on the composite was determined in substantially the same manner as in Example 1.

The composite obtained in this Example 39 showed rapid adsorption of carbon monoxide. That is, the amount of carbon monoxide adsorbed on the composite was 2.20 mmol in 1 minute, 2.50 mmol in 3 minutes, 2.56 mmol in 5 minutes, and 2.60 mmol in 10 minutes, cumulatively. The adsorption reached equilibrium 10 minutes after the start of contact of the composite with carbon monoxide. The results showed that the amount of carbon monoxide adsorbed in 10 minutes was 0.79 mmol per gram of the composite.

EXAMPLE 40

In Example 40, use was made of the same methanol as used in Example 39.

Production of a composite was performed in substantially the same manner as in Example 2, except that use was made of methanol instead of acetonitrile, to thereby obtain a composite comprising silica gel having carried thereon a binary complex of pyridine and copper(I) chloride.

Specifically, in a 50-ml one-neck eggplant type flask which had been purged with nitrogen gas was placed 0.49 g (5.0 mmol) of copper(I) chloride, and 20 ml of methanol was added as a solvent, to thereby obtain a white suspension. 1.6 ml (20 mmol) of pyridine (colorless) was added to the suspension, and the resultant mixture was stirred for 1 hour by means of a magnetic stirrer, to thereby obtain a yellowish green solution.

This change of from the white suspension to the yellowish green solution indicated that a binary complex of pyridine and copper(I) chloride was formed.

5.0 g of silica gel was placed in an eggplant type flask, and the above-obtained solution of the binary complex of pyridine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a composite comprising the silica gel having carried thereon the binary complex of pyridine and copper(I) chloride was obtained. The composite had uniform yellow color.

With respect to the obtained composite, the amount of the binary complex of. pyridine and copper(I) chloride carried on the silica gel was determined in accordance with the above-mentioned copper(I) thiocyanate method. As a result, it was found that the amount of the pyridine/copper(I)

chloride complex in the composite was 0.58 mmol per gram of the composite.

Using 5.6 g of the composite obtained above, an adsorption experiment for carbon monoxide was conducted and the amount of carbon monoxide adsorbed on the composite was determined in substantially the same manner as in Example 1.

The composite obtained in this Example 40 showed rapid adsorption of carbon monoxide. That is, the amount of carbon monoxide adsorbed on the composite was 1.99 mmol in 1 minute, 2.24 mmol in 3 minutes, 2.34 mmol in 5 minutes, and 2.38 mmol in 10 minutes, cumulatively. The adsorption reached equilibrium 10 minutes after the start of contact of the composite with carbon monoxide. The results showed that the amount of carbon monoxide adsorbed in 10 minutes was 0.42 mmol per gram of the composite.

EXAMPLE 41

In Example 41, use was made of the same methanol as used in Example 39.

Production of a composite was performed in substantially the same manner as in Example 3, except that use was made of methanol instead of acetonitrile, to thereby obtain a composite comprising activated carbon having carried thereon a binary complex of N,N,N',N'-tetramethyl-1,2-ethanediamine and copper(I) chloride.

Specifically, in a 50-ml one-neck eggplant type flask which had been purged with nitrogen gas was placed 0.38 g (3.8 mmol) of copper(I) chloride, and 7.5 ml of methanol was added as a solvent, to thereby obtain a white suspension. 0.62 ml (4.1 mmol) of N,N,N',N'-tetramethyl-1,2-ethanediamine (colorless) was added to the suspension, and the resultant mixture was stirred for 1 hour by means of a magnetic stirrer, to thereby obtain a transparent colorless solution.

This change of from the white suspension to the transparent colorless solution indicated that a binary complex of N,N,N',N'-tetramethyl-1,2-ethanediamine and copper(I) chloride was formed.

2.5 g of activated carbon was placed in an eggplant type flask, and the above-obtained solution of the binary complex of N,N,N',N'-tetramethyl-1,2-ethanediamine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a black composite comprising the activated carbon having carried thereon the binary complex of N,N,N',N'-tetramethyl-1,2-ethanediamine and copper(I) chloride was obtained.

With respect to the obtained composite, the amount of the binary complex of N,N,N',N'-tetramethyl-1,2-ethanediamine and copper(I) chloride carried on the activated carbon was determined in accordance with the above-mentioned copper(I) thiocyanate method. As a result, it was found that the amount of the N,N,N',N'-tetramethyl-1,2-ethanediamine/copper(I) chloride complex in the composite was 1.01 mmol per gram of the composite.

Using 3.3 g of the composite obtained above, an adsorption experiment for carbon monoxide was conducted and the amount of carbon monoxide adsorbed on the composite was determined in substantially the same manner as in Example 1.

The composition obtained in this Example 41 showed rapid adsorption of carbon monoxide. That is, the amount of carbon monoxide adsorbed on the composite was 2.96 mmol in 1 minute, 3.10 mmol in 3 minutes, and 3.12 mmol in 5 minutes, cumulatively. The adsorption reached equilibrium 5 minutes after the start of contact of the composite with carbon monoxide. The results showed that the amount of carbon monoxide adsorbed in 5 minutes was 0.94 mmol per gram of the composite.

EXAMPLE 42

In Example 42, use was made of the same methanol as used in Example 39.

Production of a composite was performed in substantially the same manner as in Example 4, except that use was made of methanol instead of acetonitrile, to thereby obtain a composite comprising silica gel having carried thereon a binary complex of N,N,N',N'-tetramethyl-1,2-ethanediamine and copper(I) chloride.

Specifically, in a 50-ml one-neck eggplant type flask which had been purged with nitrogen gas was placed 0.49 g (5.0 mmol) of copper(I) chloride, and 10 ml of methanol was added as a solvent, to thereby obtain a white suspension. 0.83 ml (5.5 mmol) of N,N,N',N'-tetramethyl-1,2-ethanediamine (colorless) was 5 added to the suspension, and the resultant mixture was stirred for 1 hour by means of a magnetic stirrer, to thereby obtain a transparent colorless solution.

This change of from the white suspension to the transparent colorless solution indicated that a binary complex of N,N,N',N'-tetramethyl-1,2-ethanediamine and copper(I) chloride was formed.

5.0 g of silica gel was placed in an eggplant type flask, and the above-obtained solution of the binary complex of N,N,N',N'-tetramethyl-1,2-ethanediamine and copper(I) chloride was added to the eggplant type flask. The eggplant type flask was shaken at 30° C. for 1 hour. Subsequently, the solvent was removed under reduced pressure. Then, the resultant mixture was dried at 70° C. for 3 hours under a pressure of 0.1 mmHg. Thus, a violet composite comprising the silica gel having carried thereon the binary complex of N,N,N',N'-tetramethyl-1,2-ethanediamine and copper(I) chloride was obtained.

With respect to the obtained composite, the amount of the binary complex of N,N,N',N'-tetramethyl-1,2-ethanediamine and copper(I) chloride carried on the silica gel was determined in accordance with the above-mentioned copper(I) thiocyanate method. As a result, it was found that the amount of the N,N,N',N'-tetramethyl-1,2-ethanediamine/copper(I) chloride complex in the composite was 0.65 mmol per gram of the composite.

Using 5.8 g of the composite obtained above, an adsorption experiment for carbon monoxide was conducted and the amount of carbon monoxide adsorbed on the composite was determined in substantially the same manner as in Example 1.

The composite obtained in this Example 42 showed rapid adsorption of carbon monoxide. That is, the amount of carbon monoxide adsorbed on the composite was 3.14 mmol in 1 minute, 3.30 mmol in 3 minutes, 3.37 mmol in 5 minutes, and 3.42 mmol in 10 minutes, cumulatively. The adsorption reached equilibrium 10 minutes after the start of contact of the composite with carbon monoxide. The results showed that the amount of carbon monoxide adsorbed in 10 minutes was 0.59 mmol per gram of the composite.

Comparative Example 1

Production of a composite was performed in substantially the same manner as in Example 1, except that pyridine was not used, to thereby obtain a black composite comprising activated carbon having carried thereon only copper(I) chloride.

With respect to the obtained composite, the amount of the copper(I) chloride carried on the activated carbon was determined in accordance with the above-mentioned copper (I) thiocyanate method. As a result, it was found that the amount of the copper(I) chloride in the composite was 0.49 mmol per gram of the composite.

Using 2.6 g of the above-obtained composite, an adsorption experiment for carbon monoxide was conducted and the amount of carbon monoxide adsorbed on the composite was determined in substantially the same manner as in Example 1. The composite showed adsorption of carbon monoxide. That is, the amount of carbon monoxide adsorbed on the composite was 1.03 mmol in 1 minute, and 1.13 mmol in 3 minutes, cumulatively. The adsorption reached equilibrium 3 minutes after the start of contact of the composite with carbon monoxide. The results showed that the amount of carbon monoxide adsorbed in 3 minutes was 0.43 mmol per gram of the composite.

From comparison of the adsorption data obtained above in this Comparative Example and the adsorption data in Example 1, it was found that the carbon monoxide adsorptive ability of the [pyridine/Cu(I) chloride]-activated carbon composite obtained in Example 1 is as high as 2.4 times the carbon monoxide adsorptive ability of the Cu(I) chloride-activated carbon composite obtained in this Comparative Example.

As can be seen from the above, the [pyridine compound/Cu(I) halide]-activated carbon composite adsorbent has high adsorptive ability for carbon monoxide, as compared to the Cu(I) halide-activated carbon composite adsorbent.

Comparative Example 2

Substantially the same procedure for producing a composite as in Example 1 was repeated, except that activated carbon as the carrier was not used, to thereby obtain a white binary complex of pyridine and copper(I) chloride.

With respect to 0.5 g of the complex obtained above, an adsorption experiment for carbon monoxide was conducted and the amount of the carbon monoxide adsorbed on the complex was determined in substantially the same manner as in Example 1. The complex showed almost no adsorption of carbon monoxide. That is, the amount of carbon monoxide adsorbed on the complex was 0.02 mmol in 1 minute. The adsorption reached equilibrium 1 minute after the start of contact of the complex with carbon monoxide.

From comparison of the adsorption data obtained above in this Comparative Example and the adsorption data in Example 1, it was found that the carbon monoxide adsorptive ability of the [pyridine/Cu(I) chloride]-activated carbon composite obtained in Example 1 is as high as 140 times the carbon monoxide adsorptive ability of the complex of pyridine and copper(I) chloride obtained in this Comparative Example.

As can be seen from the above, the [pyridine compound/Cu(I) halide]-activated carbon composite adsorbent has high adsorptive ability for carbon monoxide, as compared to the binary complex of pyridine compound and copper(I) halide (in non-carried form).

Comparative Example 3

Production of a composite was performed in substantially the same manner as in Example 2, except that pyridine was not used, to thereby obtain a white composite comprising the silica gel having carried thereon only copper(I) chloride.

With respect to the obtained composite, the amount of the copper(I) chloride carried on the silica gel was determined in accordance with the above-mentioned copper(I) thiocyanate method. As a result, it was found that the amount of the copper(I) chloride in the composite was 0.76 mmol per gram of the composite.

Using 5.4 g of the intact composite obtained above, an adsorption experiment for carbon monoxide was conducted and the amount of the carbon monoxide adsorbed on the composite was determined in substantially the same manner as in Example 1. The amount of carbon monoxide adsorbed on the composite was 0.37 mmol in 1 minute, 0.41 mmol in 3 minutes, 0.43 mmol in 5 minutes, 0.45 mmol in 10 minutes, cumulatively. The adsorption reached equilibrium 10 minutes after the start of contact of the composite with carbon monoxide. The results showed that the amount of carbon monoxide adsorbed in 10 minutes was 0.08 mmol per gram of the composite.

From comparison of the adsorption data obtained above in this Comparative Example and the adsorption data in Example 2, it was found that the carbon monoxide adsorptive ability of the [pyridine/Cu(I) chloride]-silica gel composite obtained in Example 2 is as high as 7.3 times the carbon monoxide adsorptive ability of the Cu(I) chloride-silica gel composite obtained in this Comparative Example.

5.4 g of the same intact composite as obtained above was contacted with carbon dioxide in substantially the same manner as mentioned above so as to adsorb carbon dioxide thereon. As a result, the composite adsorbed thereon 0.92 mmol of carbon dioxide in 10 minutes.

This means that the adsorptive ability of the composite for carbon dioxide is as high as 2.0 times that for carbon monoxide, so that the composite has a poor ability to separate carbon monoxide from a gaseous mixture of carbon dioxide and carbon monoxide.

From comparison of the carbon dioxide adsorption data obtained above in this Comparative Example and the carbon dioxide adsorption data in Example 2, it was found that the carbon dioxide adsorption by the [pyridine/Cu(I) chloride]-silica gel composite obtained in Example 2 is as low as only 0.7 times the carbon dioxide adsorption by the Cu(I) chloride-silica gel composite obtained in this Comparative Example, so that the composite obtained in Example 2 has excellent ability to separate carbon monoxide from a gaseous mixture of carbon dioxide and carbon monoxide, as compared to the composite obtained in this Comparative Example.

5.4 g of the same intact composite as obtained above was contacted with methane in substantially the same manner as mentioned above so as to adsorb methane thereon. As a result, the composite adsorbed thereon 0.13 mmol of methane in 10 minutes.

From comparison of the methane adsorption data obtained above in this Comparative Example and the methane adsorption data in Example 2, it was found that the methane adsorption by the [pyridine/Cu(I) chloride]-silica gel composite obtained in Example 2 is as low as only 0.6 times the methane adsorption by the Cu(I) chloride-silica gel composite obtained in this Comparative Example, so that the composite obtained in Example 2 has excellent ability to separate carbon monoxide from a gaseous mixture of carbon monoxide and methane, as compared to the composite obtained in this Comparative Example.

As can be seen from the above, the [pyridine compound/Cu(I) halide]-silica gel composite adsorbent has high adsorptive and desorptive ability for carbon monoxide, as compared to the Cu(I) halide-silica gel composite.

Comparative Example 4

Substantially the same procedure for producing a composite as in Example 2 was repeated, except that silica gel as the carrier was not used, to thereby obtain a white binary complex of pyridine and copper(I) chloride.

Using 0.7 g of the above-obtained binary complex, an adsorption experiment for carbon monoxide was conducted and the amount of carbon monoxide adsorbed on the binary complex was determined in substantially the same manner as in Example 1. The binary complex showed almost no adsorption of carbon monoxide. That is, the amount of carbon monoxide adsorbed on the complex was 0.03 mmol in 1 minute. The adsorption reached equilibrium 1 minute after the start of contact of the complex with carbon monoxide.

From comparison of the adsorption data obtained above in this Comparative Example and the adsorption data in Example 2, it was found that the carbon monoxide adsorptive ability of the composite [comprising the silica gel having carried thereon the binary complex of pyridine and copper(I) chloride] obtained in Example 2 is as high as 110 times the carbon monoxide adsorptive ability of the binary complex of pyridine and copper(I) chloride (in non-carried form) obtained in this Comparative Example.

Comparative Example 5

Production of a composite was performed in substantially the same manner as in Example 3, except that N,N,N',N'-tetramethyl-1,2-ethanediamine was not used, to thereby obtain a black composite comprising activated carbon having carried thereon only copper(I) chloride.

With respect to the obtained composite, the amount of copper(I) chloride carried on the activated carbon was determined in accordance with the above-mentioned copper(I) thiocyanate method. As a result, it was found that the amount of copper(I) chloride in the composite was 0.49 mmol per gram of the composite.

Using 2.6 g of the above-obtained composite, an adsorption experiment for carbon monoxide was conducted and the amount of carbon monoxide adsorbed on the composite was determined in substantially the same manner as in Example 1. The amount of carbon monoxide adsorbed on the composite was 1.03 mmol in 1 minute, and 1.13 mmol in 3 minutes, cumulatively. The adsorption reached equilibrium 3 minutes after the start of contact of the composite with carbon monoxide. The results showed that the amount of carbon monoxide adsorbed in 3 minutes was 0.43 mmol per gram of the composite.

From comparison of the adsorption data obtained above in this Comparative Example and the adsorption data in Example 3, it was found that the carbon monoxide adsorptive ability of the composite [comprising the activated carbon having carried thereon the binary complex of N,N,N',N'-tetramethyl-1,2-ethanediamine and copper(I) chloride] obtained in Example 3 is as high as 2.8 times the carbon monoxide adsorptive ability of the composite comprising the activated carbon having carried thereon copper(I) chloride obtained in this Comparative Example.

As apparent from the above, the [diamine/Cu(I) halide]-silica gel composite [wherein the diamine is represented by formula (1)] has high adsorptive and desorptive ability for carbon monoxide, as compared to a composite comprising activated carbon having carried thereon only copper(I) halide.

Comparative Example 6

Substantially the same procedure for producing a composite as in Example 3 was repeated, except that activated carbon as the carrier was not used, to thereby obtain a white binary complex of N,N,N',N'-tetramethyl-1,2-ethanediamine and copper(I) chloride.

Using 0.6 g of the above-obtained binary complex, an adsorption experiment for carbon monoxide was conducted and the amount of carbon monoxide adsorbed on the binary complex was determined in substantially the same manner as in Example 1. The binary complex showed low adsorption for carbon monoxide. That is, the amount of carbon monoxide adsorbed on the complex was 1.19 mmol in 10 minutes. The adsorption reached equilibrium 10 minutes after the start of contact of the complex with carbon monoxide.

From comparison of the adsorption data obtained above in this Comparative Example and the adsorption data in Example 3, it was found that the carbon monoxide adsorptive ability of the composite [comprising the activated carbon having carried thereon the binary complex of N,N,N',N'-tetramethyl-1,2-ethanediamine and copper(I) chloride] obtained in Example 3 is as high as 2.6 times the carbon monoxide adsorptive ability of the binary complex of N,N,N',N'-tetramethyl-1,2-ethanediamine and copper(I) chloride (in non-carried form) obtained in this Comparative Example.

As apparent from the above, a composite comprising activated carbon having carried thereon a binary complex of N,N,N',N'-tetramethyl-1,2-ethanediamine compound and a copper(I) halide, has high adsorptive ability for carbon monoxide, as compared to a binary complex of N,N,N',N'-tetramethyl-1,2-ethanediamine and copper(I) halide.

Comparative Example 7

Production of a composite was performed in substantially the same manner as in Example 4, except that N,N,N',N'-tetramethyl-1,2-ethanediamine was not used, to thereby obtain a white composite comprising silica gel having carried thereon only copper(I) chloride.

With respect to the obtained composite, the amount of the copper(I) chloride carried on the silica gel was determined in accordance with the above-mentioned copper(I) thiocyanate method. As a result, it was found that the amount of the copper(I) chloride in the composite was 0.76 mmol per gram of the composite.

Using 5.4 g of the intact composite obtained above, an adsorption experiment for carbon monoxide was conducted and the amount of carbon monoxide adsorbed on 5.4 g of the composite was determined in substantially the same manner as in Example 1. The amount of carbon monoxide adsorbed on the composite was 0.37 mmol in 1 minute, 0.41 mmol in 3 minutes, 0.43 mmol in 5 minutes, and 0.45 mmol in 10 minutes, cumulatively. The adsorption reached equilibrium 10 minutes after the start of contact of the composite with carbon monoxide. The result showed that the amount of carbon monoxide adsorbed in 10 minutes was 0.08 mmol per gram of the composite.

From comparison of the adsorption data obtained above in this Comparative Example and the adsorption data in Example 4, it was found that the carbon monoxide adsorptive ability of the composite [comprising the silica gel having carried thereon the binary complex of N,N,N',N'-tetramethyl-1,2-ethanediamine and copper(I) chloride] obtained in Example 4 is as high as 9.5 times the carbon monoxide adsorptive ability of the above-obtained composite [comprising the silica gel having carried thereon only copper(I) chloride].

5.4 g of the same intact composite as obtained above was contacted with carbon dioxide in substantially the same manner as mentioned above so as to adsorb carbon dioxide thereon. As a result, it was found that the amount of carbon dioxide adsorbed on the composite in 10 minutes was 0.92 mmol.

This means that the carbon dioxide adsorption by the composite obtained in this Comparative Example is as high as 2.0 times the carbon monoxide adsorption, so that the composite has poor ability to separate carbon monoxide by adsorption from a gaseous mixture of carbon monoxide and carbon dioxide.

From comparison of the carbon dioxide adsorption data obtained above in this Comparative Example and the carbon dioxide adsorption data obtained in Example 4, it was found that the carbon dioxide adsorption by the composite [comprising the silica gel having carried thereon the binary complex of N,N,N',N'-tetramethyl-1,2-ethanediamine and copper(I) chloride] obtained in Example 4 is as low as 0.5 times the carbon dioxide adsorption by above-obtained composite [comprising the silica gel having carried thereon only copper(I) chloride], so that the composite obtained in Example 4 has the high ability to separate carbon monoxide by adsorption from a gaseous mixture of carbon monoxide and carbon dioxide, as compared to the composite obtained in this Comparative Example.

5.4 g of the same intact composite as obtained above was contacted with methane in substantially the same manner as mentioned above so as to adsorb methane thereon. As a result, it was found that the amount of methane adsorbed on the composite in 10 minutes was 0.13 mmol.

From comparison of the methane adsorption data obtained above in this Comparative Example and the methane adsorption data in Example 4, it was found that the methane adsorption by the composite [comprising the silica gel having carried thereon the binary complex of N,N,N',N'-tetramethyl-1,2-ethanediamine and copper(I) chloride] obtained in Example 4 is as low as 0.8 times the methane adsorption by the above-obtained composite [comprising the silica gel having carried thereon only copper(I) chloride], so that the composite obtained in Example 4 has the high ability to separate carbon monoxide by adsorption from a gaseous mixture of carbon monoxide and methane, as compared to the composite obtained in this Comparative Example.

As can be seen from the above, the composite [comprising the silica gel having thereon the binary complex of N,N,N',N'-tetramethyl-1,2-ethanediamine and copper(I) chloride] obtained in Example 4 has a high adsorptive and desorptive ability for carbon monoxide, as compared to that of the above-obtained composite [comprising the silica gel having carried thereon copper(I) chloride].

Comparative Example 8

Substantially the same procedure for producing a composite as in Example 4 was repeated, except that silica gel as the carrier was not used, to thereby obtain a white binary complex of N,N,N',N'-tetramethyl-1,2-ethanediamine and copper(I) chloride.

Using 0.8 g of the obtained binary complex, an adsorption experiment for carbon monoxide was conducted and the amount of carbon monoxide adsorbed on the binary complex was determined in substantially the same manner as in Example 1. The binary complex showed low adsorption of carbon monoxide. That is, the amount of carbon monoxide adsorbed on the complex was 1.59 mmol in 10 minutes. The adsorption reached equilibrium 10 minutes after the start of contact of the complex with carbon monoxide.

From comparison of the adsorption data obtained above in this Comparative Example and the adsorption data in Example 4, it was found that the carbon monoxide adsorption by the composite [comprising the silica gel having carried thereon the binary complex of N,N,N',N'-tetramethyl-1,2-ethanediamine and copper(I) chloride] obtained in Example 4 is as high as 2.7 times the carbon monoxide adsorption by the binary complex [of N,N,N',N'-tetramethyl-1,2-ethanediamine and copper(I) chloride] obtained in this Comparative Example.

As can be seen from the above, the composite comprising silica gel having carried thereon binary complex of N,N,N',N'-tetramethyl-1,2-ethanediamine and a copper(I) halide has a high adsorptive and desorptive ability for carbon monoxide, as compared to that of the binary complex of N,N,N',N'-tetramethyl-1,2-ethanediamine and a copper(I) halide (in non-carried form).

Industrial Applicability

The adsorbent of the present invention, which comprises a composite comprised of a porous inorganic carrier and, carried thereon, a binary complex of a copper(I) halide and a nitrogen-containing compound selected from the group consisting of a pyridine compound and a specific diamine, is advantageous not only in that the adsorbent can efficiently adsorb carbon monoxide with high selectivity, but also in that the carbon monoxide adsorbed on the adsorbent can be easily desorbed and released under moderate conditions. Therefore, the adsorbent of the present invention can be advantageously used for obtaining an gaseous mixture having a high concentration of carbon monoxide. Even when the adsorbent of the present invention is unintendedly caused to contact an oxygen-containing gas, such as the air, by an operational error or the like, thereby deteriorating the adsorbent to have a poor adsorptive and desorptive ability for carbon monoxide, the adsorptive ability and desorptive ability of the deteriorated adsorbent can be recovered by treating the deteriorated adsorbent with a reducing agent. Further, since a conventional carrier can be used for producing the excellent adsorbent of the present invention, the adsorbent of the present invention is advantageous from economical view point. Also, since the adsorbent is a solid, it can be handled with ease.

The method of the present invention for producing the adsorbent, in which hydrochloric acid is not used, but an organic solvent is used, is advantageous in that the method is free from the danger of occurrence of the corrosion of the production apparatus. In addition, since the amount of energy required for the removal of the solvent by heating or vacuum distillation is small, and the solvent can be recovered and recycled, the method of the present invention is also advantageous in that the energy and the resources can be saved. The industrial and commercial value of the method of the present invention is very high.

What is claimed is:

1. An adsorbent for carbon monoxide, comprising a composite comprised of a porous inorganic carrier and carried thereon, a complex of a nitrogen-containing compound and a copper(I) halide, said nitrogen-containing compound being at least one member selected from the group consisting of (a) at least one pyridine compound selected from pyridine and a derivative thereof and (b) a diamine represented by the following formula (1):

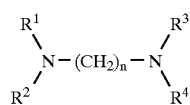

(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, $R^3$ and $R^4$ represents an alkyl group having 1 to 4 carbon atoms, wherein said complex contains said nitrogen-containing compound in a molar ratio of from 0.2 to 5.0 relative to said copper(I) halide in said complex, and wherein said complex is carried on said porous inorganic carrier in an amount of from 0.2 to 10 mmol in terms of the molar amount of copper(I) in said complex per gram of said porous inorganic carrier.

2. The adsorbent according to claim 1, wherein said porous inorganic carrier is selected from the group consisting of silica gel, activated carbon, alumina, magnesia, titania, zirconia, silica-magnesia, zeolite and silica-alumina.

3. The adsorbent according to claim 2, wherein said porous inorganic carrier is selected from the group consisting of silica gel and activated carbon.

4. A composite comprising activated carbon and, carried thereon, a complex of a nitrogen-containing compound and a copper(I) halide, said nitrogen-containing compound being selected from the group consisting of (a) at least one pyridine compound selected from pyridine and a derivative thereof and (b) a diamine represented by the following formula (1):

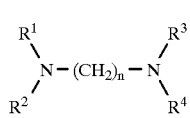

(1)

wherein n is 2 or 3 and each of $R^1$, $R^2$, $R^3$ and $R^4$ independently represents a hydrogen atom or an alkyl group having 1 to 4 carbon atoms, with the proviso that when n is 2, each of at least two of $R^1$, $R^2$, $R^3$ and $R^4$ represents an alkyl group having 1 to 4 carbon atoms and that when n is 3, at least one of $R^1$, $R^2$, $R^3$ and $R^4$ represents an alkyl group having 1 to 4 carbon atoms, wherein said complex contains said nitrogen-containing compound in a molar ratio of from 0.2 to 5.0 relative to said copper(I) halide in said complex, and wherein said complex is carried on said activated carbon in an amount of from 0.2 to 10 mmol in terms of the molar amount of copper(I) in said complex per gram of said activated carbon.

* * * * *